(12) United States Patent
Luo et al.

(10) Patent No.: US 11,082,964 B2
(45) Date of Patent: *Aug. 3, 2021

(54) DATA AND CONTROL MULTIPLEXING FOR UPLINK DATA TRANSMISSION METHOD AND DEVICE

(71) Applicant: Huawei Technologies Co., Ltd., Shenzhen (CN)

(72) Inventors: Hejia Luo, Hangzhou (CN); Rong Li, Hangzhou (CN); Guangzhu Zeng, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/736,511

(22) Filed: Jan. 7, 2020

(65) Prior Publication Data

US 2020/0145989 A1 May 7, 2020

Related U.S. Application Data

(63) Continuation of application No. 15/860,512, filed on Jan. 2, 2018, now Pat. No. 10,560,926, which is a (Continued)

(51) Int. Cl.
*H04W 4/00* (2018.01)
*H04W 72/04* (2009.01)

(52) U.S. Cl.
CPC ..... *H04W 72/0413* (2013.01); *H04W 72/044* (2013.01)

(58) Field of Classification Search
CPC ................. H04W 72/044; H04W 72/0413; H04W 40/00
See application file for complete search history.

(56) References Cited

U.S. PATENT DOCUMENTS 7,729,234 B2 * 6/2010 Byun ............... H04L 5/023
370/208
8,958,494 B2 * 2/2015 Beluri ............... H04B 7/0417
375/267

(Continued)

FOREIGN PATENT DOCUMENTS

CN 101043500 A 9/2007
CN 101132212 A 2/2008
(Continued)

OTHER PUBLICATIONS

U.S. Appl. No. 15/860,512, filed Jan. 2, 2018.
(Continued)

*Primary Examiner* — Abdelnabi O Musa
(74) *Attorney, Agent, or Firm* — Leydig, Voit & Mayer, Ltd.

(57) ABSTRACT

An uplink data transmission method and device are provided. The method includes: receiving, by a network device, a control symbol sent by a terminal device by using a control time-frequency resource, wherein the control symbol carries control information, wherein the control information indicates a data encoding scheme at the terminal device, wherein the control time-frequency resource belongs to a transmission resource that includes a data time-frequency resource, and wherein the control time-frequency resource and the data time-frequency resource are different; demodulating and decoding, at the network device, the control symbol to obtain the control information; and decoding, at the network device and according to the control information, a data symbol to obtain uplink data, wherein the data symbol is received from the terminal device by way of the data time-frequency resource.

20 Claims, 7 Drawing Sheets

Related U.S. Application Data continuation of application No. PCT/CN2015/083099, filed on Jul. 1, 2015.

(56) References Cited

U.S. PATENT DOCUMENTS

| | | | |
|---|---|---|---|
| 2008/0095110 A1* | 4/2008 | Montojo | H04L 5/0017 370/330 |
| 2009/0073922 A1* | 3/2009 | Malladi | H04L 1/1664 370/328 |
| 2009/0268844 A1 | 10/2009 | Kinnunen et al. | |
| 2011/0274123 A1 | 11/2011 | Hammarwall et al. | |
| 2012/0236809 A1 | 9/2012 | Senoo | |
| 2013/0010634 A1 | 1/2013 | Lim et al. | |
| 2013/0242755 A1* | 9/2013 | Seki | H04L 5/0051 370/242 |
| 2014/0254544 A1 | 9/2014 | Kar Kin Au et al. | |

FOREIGN PATENT DOCUMENTS

| | | |
|---|---|---|
| CN | 101772970 A | 7/2010 |
| WO | 2008030798 A2 | 3/2008 |
| WO | 2009020983 A1 | 2/2009 |

OTHER PUBLICATIONS

Bayesteh et al.,"Blind Detection of SCMA for Uplink Grant-Free Multiple-Access," pp. 1-5, Institute of Electrical and Electronics Engineers, New York, New York (2014).

* cited by examiner

200

A network device receives a control symbol sent by a terminal device by using a control time-frequency resource, where the control symbol is generated after the terminal device performs encoding and modulation processing on control information according to a control encoding scheme and a control modulation scheme that are used by the terminal device, the control information is used to indicate a data encoding scheme used by the terminal device, the control time-frequency resource belongs to a transmission resource that is used for uplink transmission, the transmission resource further includes a data time-frequency resource, and the control time-frequency resource and the data time-frequency resource are different ~ S210

Perform demodulation and decoding processing on the control symbol according to the control encoding scheme and the control modulation scheme that are used by the terminal device, to obtain the control information ~ S220

Perform, according to the control information, decoding processing on a data symbol sent by the terminal device by using the data time-frequency resource, to obtain uplink data, where the data symbol is generated after the terminal device performs encoding processing on the uplink data according to the data encoding scheme used by the terminal device ~ S230

A terminal device performs encoding and modulation processing on control information according to a control encoding scheme and a control modulation scheme that are used by the terminal device, to obtain a control symbol, where the control information is used to indicate a data encoding scheme used by the terminal device ⎯ S410

Send the control symbol to a network device by using a control time-frequency resource, and send a data symbol to the network device by using a data time-frequency resource, where the control time-frequency resource and the data time-frequency resource belong to a transmission resource that is used for uplink transmission, the control time-frequency resource and the data time-frequency resource are different, and the data symbol is generated after the terminal device performs encoding processing on uplink data according to the data encoding scheme used by the terminal device ⎯ S420

FIG. 7

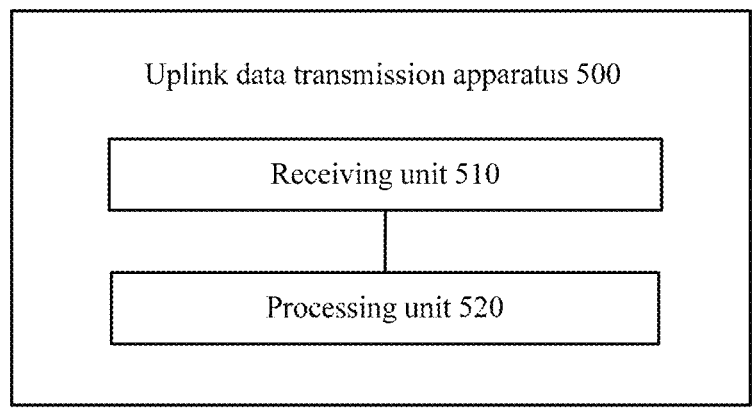

FIG. 8

DATA AND CONTROL MULTIPLEXING FOR UPLINK DATA TRANSMISSION METHOD AND DEVICE

CROSS-REFERENCE TO RELATED APPLICATIONS

This application is a continuation of U.S. patent application Ser. No. 15/860,512, filed on Jan. 2, 2018, which is a continuation of International Application No. PCT/CN2015/083099, filed on Jul. 1, 2015. All of the afore-mentioned patent applications are hereby incorporated by reference in their entireties.

TECHNICAL FIELD

Embodiments of the present application relate to the field of communications technologies, and more specifically, relates to a data processing method and device.

BACKGROUND

In a currently known uplink data transmission solution, encoding processing and modulation processing are performed on uplink data that needs to be sent to a network device by a terminal device, to obtain modulation symbols. The network device performs demodulation processing and decoding processing on the received modulation symbols, to obtain the uplink data.

To improve reliability of the solution, in the foregoing process, the terminal device and the network device need to use an encoding scheme and a decoding scheme that correspond to each other.

In an existing manner, an encoding scheme (or a decoding scheme) for uplink transmission is determined by a network device and then notified to a terminal device. That is, when determining to allocate a time-frequency resource for uplink transmission of the terminal device, the network device performs quality measurement on an uplink channel according to a pilot signal from the terminal device, determines, according to a measurement result, an encoding scheme to be used by the terminal device during uplink transmission on the uplink channel, and notifies the terminal device of the encoding scheme.

However, in the existing manner, the terminal device can perform uplink transmission only after obtaining the encoding scheme notified by the network device. This affects flexibility of uplink transmission.

Therefore, a technology is required to improve flexibility of uplink transmission.

SUMMARY

Embodiments of the present application provide an uplink data transmission method and device, to improve flexibility of uplink transmission.

According to a first aspect, an uplink data transmission method is provided. The method includes an uplink data transmission method. The method includes the following steps: A network device receives a control symbol sent by a terminal device by using a control time-frequency resource. The control symbol is generated after the terminal device performs encoding and modulation processing on control information according to a control encoding scheme and a control modulation scheme that are used by the terminal device. The control information is used to indicate a data encoding scheme used by the terminal device. The control time-frequency resource belongs to a transmission resource that is used for uplink transmission. The transmission resource further includes a data time-frequency resource. The control time-frequency resource and the data time-frequency resource are different. The network device performs demodulation and decoding processing on the control symbol according to the control encoding scheme and the control modulation scheme that are used by the terminal device, to obtain the control information. The network device performs, according to the control information, decoding processing on a data symbol sent by the terminal device by using the data time-frequency resource, to obtain uplink data. The data symbol is generated after the terminal device performs encoding processing on the uplink data according to the data encoding scheme used by the terminal device.

According to a second aspect, an uplink data transmission method is provided. The method includes the following steps: A terminal device performs encoding and modulation processing on control information according to a control encoding scheme and a control modulation scheme that are used by the terminal device, to obtain a control symbol. The control information is used to indicate a data encoding scheme used by the terminal device. The terminal device sends the control symbol to a network device by using a control time-frequency resource, and transmits a data symbol to the network device by using a data time-frequency resource. The control time-frequency resource and the data time-frequency resource belong to a transmission resource that is used for uplink transmission. The control time-frequency resource and the data time-frequency resource are different. The data symbol is generated after the terminal device performs encoding processing on uplink data according to the data encoding scheme used by the terminal device.

According to a third aspect, an uplink data transmission device is provided. The device includes a receiver and a processor connected to the receiver. The processor is configured to control the receiver to receive a control symbol sent by a terminal device by using a control time-frequency resource. The control symbol is generated after the terminal device performs encoding and modulation processing on control information according to a control encoding scheme and a control modulation scheme that are used by the terminal device. The control information is used to indicate a data encoding scheme used by the terminal device. The control time-frequency resource belongs to a transmission resource that is used for uplink transmission. The transmission resource further includes a data time-frequency resource. The control time-frequency resource and the data time-frequency resource are different. The processor is configured to perform demodulation and decoding processing on the control symbol according to the control encoding scheme and the control modulation scheme that are used by the terminal device, to obtain the control information. The processor is configured to perform, according to the control information, decoding processing on a data symbol sent by the terminal device by using the data time-frequency resource, to obtain uplink data. The data symbol is generated after the terminal device performs encoding processing on the uplink data according to the data encoding scheme used by the terminal device.

According to a fourth aspect, an uplink data transmission device is provided. The device includes a transmitter and a processor connected to the transmitter. The processor is configured to perform encoding and modulation processing on control information according to a control encoding scheme and a control modulation scheme that are used by the device, to obtain a control symbol. The control information is used to indicate a data encoding scheme used by the device. The processor is configured to control the transmitter to send the control symbol to a network device by using a control time-frequency resource, and to send a data symbol to the network device by using a data time-frequency resource. The control time-frequency resource and the data time-frequency resource belong to a transmission resource that is used for uplink transmission. The control time-frequency resource and the data time-frequency resource are different. The data symbol is generated after the device performs encoding processing on uplink data according to the data encoding scheme used by the device.

According to the uplink data transmission method and device in the embodiments of the present application, a time-frequency resource used for uplink transmission is divided into a control time-frequency resource and a data time-frequency resource. A network device and a terminal device agree to use a control encoding scheme and a control modulation scheme that are specific to information carried on the control time-frequency resource. After determining a data encoding scheme specific to uplink data, the terminal device performs, according to the agreed control encoding scheme and control modulation scheme, encoding processing and modulation processing on control information that indicates the data encoding scheme, to generate a control symbol. Correspondingly, the network device can perform demodulation processing and decoding processing on the control symbol according to the agreed control encoding scheme and control modulation scheme, to obtain the control information, and determine the uplink data encoding scheme indicated by the control information. This can implement negotiation of an uplink data encoding scheme without notification from the network device, and improve flexibility of uplink transmission.

BRIEF DESCRIPTION OF DRAWINGS

FIG. 2 is a schematic flowchart of an uplink data transmission method according to an embodiment of the present application;

FIG. 7 is a schematic flowchart of an uplink data transmission method according to another embodiment of the present application;

FIG. 8 is a schematic structural diagram of an uplink data transmission apparatus according to an embodiment of the present application;

DESCRIPTION OF EMBODIMENTS

Figure 1:
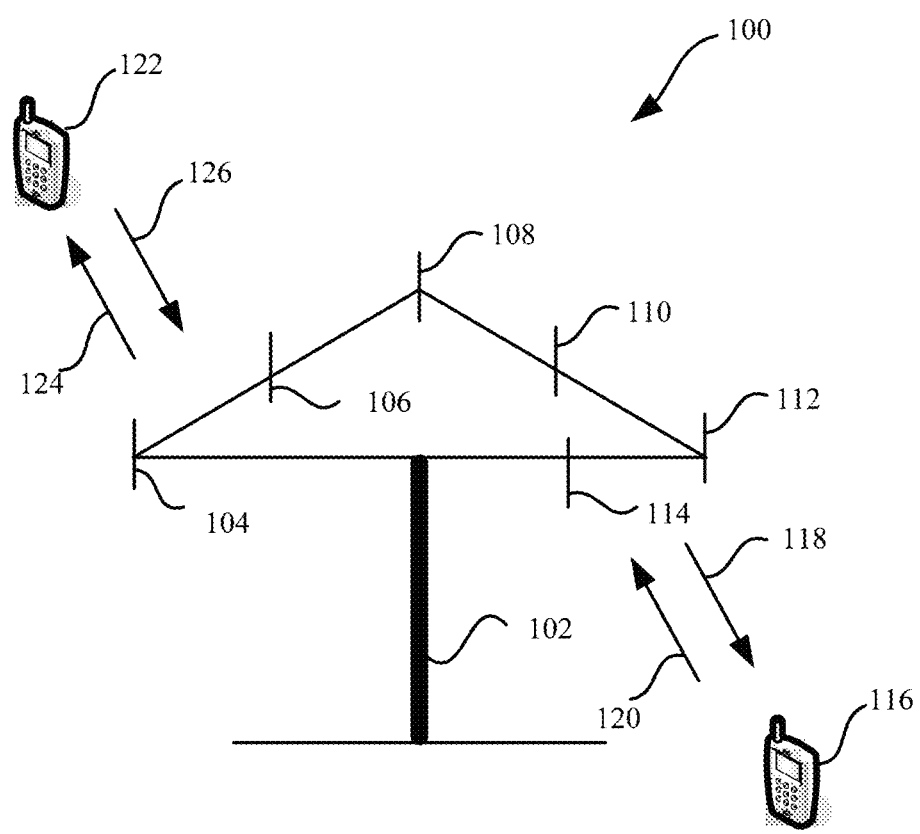
FIG. 1 is a schematic diagram of a communications system to which an uplink data transmission method of the present application is applicable.

The following clearly describes the technical solutions in the embodiments of the present application with reference to the accompanying drawings in the embodiments of the present application. Apparently, the described embodiments are some but not all of the embodiments of the present application. All other embodiments obtained by persons of ordinary skill in the art based on the embodiments of the present application without creative efforts shall fall within the protection scope of the present application.

Terms such as "component", "module", and "system" used in this specification are used to indicate computer-related entities, hardware, firmware, combinations of hardware and software, software, or software being executed. For example, a component may be but is not limited to a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (such as data from a component interacting with another component in a local system, a distributed system, and/or across a network such as the Internet interacting with other systems by using the signal).

Solutions of the embodiments of the present application can be applied to an existing cellular communications system, such as a Global System for Mobile Communications ("GSM" for short) system, a Wideband Code Division Multiple Access ("WCDMA" for short) system, a Wideband Code Division Multiple Access ("WCDMA" for short) system, a Long Term Evolution ("LTE" for short) system, and support mainly voice and data communication. Generally, a limited quantity of connections is supported by a conventional base station, and implementation is easy.

A next-generation mobile communications system not only supports conventional communication, but also supports M2M (Machine to Machine) communication, which may also be referred to as MTC (Machine Type Communication). It is predicted that a quantity of MTC devices connected to networks will be up to 50 billion to 100 billion by 2020. This quantity will be far greater than a quantity of existing connections. M2M services are diverse in service types, and different types of M2M services have quite different network requirements. Roughly, there may be the following several requirements:

reliable delay-insensitive transmission; and highly reliable low-delay transmission.

A service that needs reliable delay-insensitive transmission is relatively easy to process. However, a service that needs highly reliable low-delay transmission, such as a V2V (Vehicle-to-Vehicle) service, needs not only a low transmission delay but also high reliability. Unreliable transmission causes retransmission. As a result, the transmission delay becomes excessively high, and requirements cannot be met.

Existence of a large quantity of connections makes a future wireless communications system differ greatly from an existing communications system. Because of the large quantity of connections, more resources need to be consumed for a terminal device to access, and more resources need to be consumed for transmission of scheduling signaling related to data transmission of a terminal device. According to the solutions of the embodiments of the present application, the problem of resource consumption can be effectively resolved.

Optionally, the network device is a base station, and the terminal device is user equipment.

The present application describes the embodiments with reference to a terminal device. The terminal device may be referred to as user equipment (UE), an access terminal, a subscriber unit, a subscriber station, a mobile station, a remote station, a remote terminal, a mobile device, a user terminal, a terminal, a wireless communications device, a user agent, or a user apparatus. The terminal device may be an ST (station) in a WLAN (Wireless Local Area Network), a cellular phone, a cordless phone, a SIP (Session Initiation Protocol) phone, a WLL (Wireless Local Loop) station, a PDA (Personal Digital Assistant), a handheld device having a wireless communication function, a computing device, another processing device connected to a wireless modem, an in-vehicle device, a wearable device, a terminal device in a future 5G network or a terminal device in a future evolved PLMN network, or the like.

In addition, the present application describes the embodiments with reference to a network device. The network device may be a device configured to communicate with a mobile device. The network device may be an AP (access point) in a WLAN (Wireless Local Area Networks), a BTS (Base Transceiver Station) in the GSM or CDMA (Code Division Multiple Access), an NB (NodeB) in the WCDMA, an eNB or eNodeB (Evolved NodeB) in the LTE (Long Term Evolution), a relay node or an access point, an in-vehicle device, a wearable device, a network device in a future 5G network or a network device in a future evolved PLMN network, or the like.

In addition, aspects or features of the present application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to a magnetic storage component (such as a hard disk, a floppy disk, or a magnetic tape), an optical disc (such as a CD (Compact Disc), or a DVD (Digital Versatile Disc), and a smart card and a flash memory component (such as an EPROM (Erasable Programmable Read-Only Memory), a card, a stick, or a key drive). In addition, various storage media described in this specification may indicate one or more devices and/or other machine-readable media configured to store information. The term "machine-readable media" may include but is not limited to a radio channel and various other media that can store, contain and/or carry an instruction and/or data.

FIG. 1 is a schematic diagram of a communications system 100 to which an uplink data transmission method of the present application is applicable. As shown in FIG. 1, the communications system 100 includes a network device 102. The network device 102 may include multiple antennas such as antennas 104, 106, 108, 110, 112, and 114. In addition, the network device 102 may additionally include a transmitter chain and a receiver chain. Persons of ordinary skill in the art may understand that both the transmitter chain and the receiver chain may include multiple components (for example, a processor, a modulator, a multiplexer, a demodulator, a demultiplxer, or an antenna) related to signal transmission and reception.

The network device 102 may communicate with multiple terminal devices (for example, a terminal device 116 and a terminal device 122). However, it can be understood that the network device 102 may communicate with any quantity of terminal devices similar to the terminal device 116 or 122. The terminal devices 116 and 122 may be, for example, a cellular phone, a smartphone, a portable computer, a handheld communications device, a handheld computing device, a satellite radio apparatus, a global positioning system, a PDA, and/or any other appropriate devices that are used for communication in the wireless communications system 100.

As shown in FIG. 1, the terminal device 116 communicates with the antennas 112 and 114. The antennas 112 and 114 send information to the terminal device 116 by using a forward link 118, and receive information from the terminal device 116 by using a reverse link 120. In addition, the terminal device 122 communicates with the antennas 104 and 106. The antennas 104 and 106 send information to the terminal device 122 by using a forward link 124, and receive information from the terminal device 122 by using a reverse link 126.

For example, in a frequency division duplex (FDD) system, the forward link 118 may use a frequency band different from that used by the reverse link 120, and the forward link 124 may use a frequency band different from that used by the reverse link 126.

For another example, in a time division duplex (TDD) system and a full duplex system, the forward link 118 and the reverse link 120 may use a same frequency band, and the forward link 124 and the reverse link 126 may use a same frequency band.

Each antenna (or each antenna set including multiple antennas) and/or each region designed for communication are/is referred to as a sector of the network device 102. For example, an antenna set may be designed to communicate with a terminal device in a sector of a coverage region of the network device 102. When the network device 102 communicates with the terminal devices 116 and 122 by using the forward links 118 and 124 respectively, a transmit antenna of the network device 102 may improve signal-to-noise ratios of the forward links 118 and 124 by means of beamforming. In addition, compared with a manner in which a network device sends a signal to all terminal devices of the network device by using a single antenna, when the network device 102 sends a signal to randomly dispersed terminal devices 116 and 122 in a related coverage region by means of beamforming, a mobile device in a neighboring cell receives less interference.

At a given time, the network device 102, the terminal device 116, or the terminal device 122 may be a wireless communications sending apparatus and/or a wireless communications receiving apparatus. When sending data, the wireless communications sending apparatus may encode the data for transmission. Specifically, the wireless communications sending apparatus may obtain (for example, generate, receive from another communications apparatus, or store in a memory) a particular quantity of data bits to be sent to the wireless communications receiving apparatus by using a channel. The data bits may be included in a data transport block (or multiple transport blocks), and the transport block may be segmented to generate multiple code blocks.

In addition, the communications system 100 may be a public land mobile network ("PLMN" for short), a D2D network, an M2M network, or another network. FIG. 1 is merely an example of a simplified schematic diagram. The network may further include another network device that is not shown in FIG. 1.

FIG. 2 is a schematic flowchart of an uplink data transmission method 200 according to an embodiment of the present application from a perspective of a network device. As shown in FIG. 2, the method 200 includes the following steps:

S210. The network device receives a control symbol sent by a terminal device by using a control time-frequency resource, where the control symbol is generated after the terminal device performs encoding and modulation processing on control information according to a control encoding scheme and a control modulation scheme that are used by the terminal device, the control information is used to indicate a data encoding scheme used by the terminal device, the control time-frequency resource belongs to a transmission resource that is used for uplink transmission, the transmission resource further includes a data time-frequency resource, and the control time-frequency resource and the data time-frequency resource are different.

S220. Perform demodulation and decoding processing on the control symbol according to the control encoding scheme and the control modulation scheme that are used by the terminal device, to obtain the control information.

S230. Perform, according to the control information, decoding processing on a data symbol sent by the terminal device by using the data time-frequency resource, to obtain uplink data, where the data symbol is generated after the terminal device performs encoding processing on the uplink data according to the data encoding scheme used by the terminal device.

Optionally, the data symbol is sent by the terminal device to the network device in a grant-free transmission mode. The grant-free transmission means that the network device preallocates multiple transmission resources and notifies the terminal device of the multiple transmission resources, so that the terminal device selects at least one transmission resource from the multiple transmission resources when having an uplink data transmission requirement, and sends the uplink data by using the selected transmission resource.

Specifically, in recent years, researchers propose an uplink grant-free transmission solution to resolve a series of problems caused by access of a massive quantity of users. The method 200 in this embodiment of the present application can be used during uplink transmission that is based on the grant-free (that is, using a grant-free transmission resource) solution.

Grant-free refers to a method that user data uplink transmission can be implemented on a public land mobile network without dynamic scheduling performed by a network device. Specifically, in the method, a user uses, according to different services or on a specified time-frequency resource, a data transmission manner (for example, a pilot and data are transmitted together) supported by the time-frequency resource including a code domain resource, a pilot resource, and the like, to reduce network signaling and a transmission delay.

To deal with a large quantity of MTC services in a future network and to meet a requirement of highly reliable low-delay transmission of services, a grant-free transmission solution is provided in the patent. Grant-free transmission herein may be specific to uplink data transmission. Grant-free transmission may be understood as one or more of the following meanings, or a combination of some technical features in multiple meanings, or another similar meaning:

Grant-free transmission: A network device preallocates multiple transmission resources and notifies a terminal device of the multiple transmission resources. When having an uplink data transmission requirement, the terminal device selects at least one transmission resource from the multiple transmission resources preallocated by the network device, and sends uplink data by using the selected transmission resource. The network device detects, on one or more of the preallocated multiple transmission resources, the uplink data sent by the terminal device. The detection may be blind detection, may be detection performed according to a control field in the uplink data, or may be detection performed in another manner.

Grant-free transmission: A network device preallocates multiple transmission resources and notifies a terminal device of the multiple transmission resources. When having an uplink data transmission requirement, the terminal device selects at least one transmission resource from the multiple transmission resources preallocated by the network device, and sends uplink data by using the selected transmission resource.

Grant-free transmission: Information about preallocated multiple transmission resources is obtained. When there is an uplink data transmission requirement, at least one transmission resource is selected from the multiple transmission resources, and uplink data is sent by using the selected transmission resource. The information may be obtained from a network device.

Grant-free transmission may refer to a method for transmitting uplink data by a terminal device without dynamic scheduling performed by a network device. The dynamic scheduling may be a scheduling manner in which the network device indicates, by using signaling, a transmission resource for each uplink data transmission of the terminal device. Optionally, it may be understood that implementation of uplink data transmission of the terminal device means that two or more terminal devices are allowed to perform uplink data transmission on a same time-frequency resource. Optionally, the transmission resource may be a resource transmitted at one or more transmission time units that are after a moment at which UE receives the signaling. One transmission time unit may be a minimum time unit for one transmission, for example, a transmission time interval ("TTI" for short) with a value of 1 ms. Alternatively, one transmission time unit may be a preset transmission time unit.

Grant-free transmission: A terminal device transmits uplink data without a grant from a network device. For the meaning of the grant, a terminal device transmits an uplink scheduling request to a network device, and after receiving the scheduling request, the network device sends an uplink grant to the terminal device, and the uplink grant indicates an uplink transmission resource allocated to the terminal device.

Grant-free transmission may refer to a contention transmission mode in which specifically multiple terminals simultaneously transmit uplink data on a same preallocated time-frequency resource without a grant from a base station.

The data may include service data or signaling data.

The blind detection may be understood as detection performed, when it is not predicted whether data has arrived, on data that may arrive. The blind detection may also be understood as detection performed without an explicit signaling indication.

The transmission resource may include but is not limited to one or a combination of the following resources:

α. a time domain resource, such as a radio frame, a subframe, or a symbol;

β. a frequency domain resource, such as a subcarrier or a resource block;

γ. a space domain resource, such as a transmit antenna or a beam;

θ. a code domain resource, such as a sparse code multiple access (SCMA for short) codebook, a low-density signature (LDS for short) sequence, or a CDMA code; or δ. an uplink pilot resource.

The transmission resources may be used for transmission according to a control mechanism that includes but is not limited to the following:

a. uplink power control, such as uplink transmit power upper-limit control;

b. modulation and encoding scheme setting, such as a transport block size setting, a bit rate setting, and a modulation order setting; or c. a retransmission mechanism, such as a HARQ mechanism.

A contention transmission unit (CTU for short) may be a basic transmission resource in grant-free transmission. The CTU may be a transmission resource including a time resource, a frequency resource, and a code domain resource; may refer to a transmission resource including a time resource, a frequency resource, and a pilot resource; or may refer to a transmission resource including a time resource, a frequency resource, a code domain resource, and a pilot resource.

A CTU access region may be a time-frequency region corresponding to the CTU.

The application with Patent No. PCT/CN2014/073084 and entitled "System and Method for Uplink Grant-free Transmission Scheme" provides a technical solution for uplink grant-free transmission. The application PCT/CN2014/073084 describes that a radio resource can be divided into various CTUs, and that UE is mapped to a CTU. A group of codes may be allocated to each CTU. The allocated group of codes may be a group of CDMA codes, an SCMA codebook set, an LDS sequence group, a signature group, or the like. Each code may be corresponding to a group of pilots. A UE may select a code and a pilot in a pilot group corresponding to the code to perform uplink transmission. It can be also understood that content of the application PCT/CN2014/073084 is incorporated by reference and is used as a part of this embodiment of the present application. Details are not further described.

In a communications system to which the method 200 is applicable, there may be multiple (two or more) terminal devices. Each terminal device independently selects, according to the grant-free solution, a grant-free transmission resource to send uplink data to a network device. In addition, pilots may be in a one-to-one correspondence to transmission resources (or grant-free resources). The network device may learn of, according to a pilot selected by each terminal device, a transmission resource selected by the terminal device.

Optionally, the control time-frequency resource and the data time-frequency resource that are used by the terminal device belong to a time-frequency resource corresponding to a contention transmission unit CTU used by the terminal device during uplink transmission.

Specifically, in a current grant-free solution, it is defined that the CTU is used as a unit carrying information. User equipment maps data to the CTU according to a rule to complete uplink data transmission. A base station side performs blind detection on the CTU resource to restore carried user data.

Figure 3:
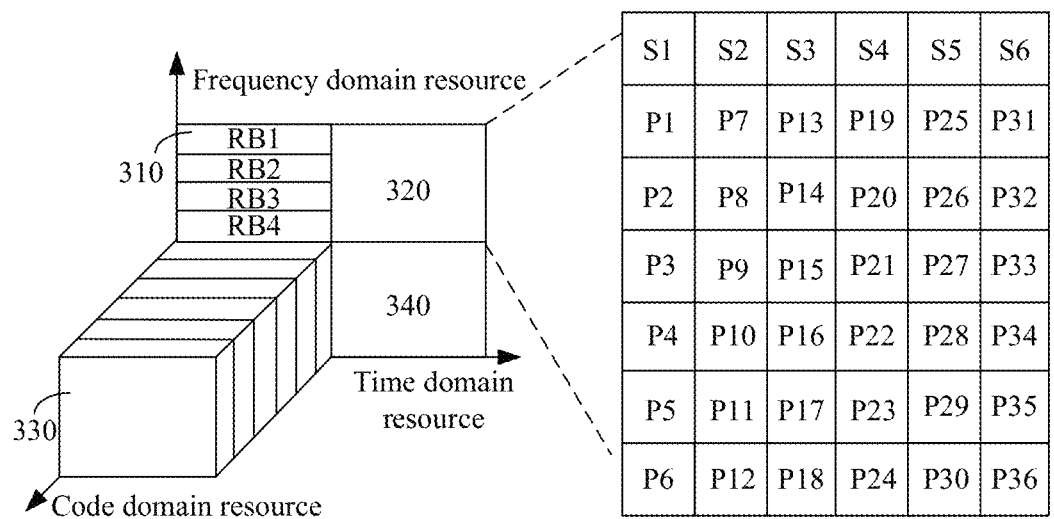
FIG. 3 is a schematic diagram of a time-frequency resource used for grant-free transmission according to an embodiment of the present application.

FIG. 3 shows that an available bandwidth is divided into time-frequency regions of four contention access regions (also referred to as CTU access regions), that is, CTU access regions 310, 320, 330, and 340. Each CTU access region may occupy a predetermined quantity of resource blocks. For example, in the embodiment of FIG. 3, the CTU access region 310 includes four RBs: RB1, RB2, RB3, and RB4. This embodiment of the present application is not limited thereto. For example, different contention access regions may include different quantities of RBs. In FIG. 3, each CTU access region can support 36 UEs contending for 36 CTUs defined in the CTU access region. Each CTU is a combination of a time domain resource, a frequency domain resource, a code domain resource, and a pilot. The code domain resource includes a CDMA code, an SCMA code, an LDS sequence, another signature, or the like. Each contention access region occupies one time-frequency resource region. Each time-frequency resource region supports six code domain resources (S1 to S6), and each code domain resource is mapped to six pilots. Therefore, a total of 36 pilots (P1 to P36) are generated. The network device may use a pilot or a code domain resource decorrelator to detect or decode a signal sent on a CTU by each UE.

When entering a coverage area of a source network device, the terminal device may receive higher layer signaling sent by the network device. The higher layer signaling may carry a CTU access region definition, a total quantity of CTUs, a default mapping rule, and the like. Alternatively, the terminal device may preconfigure a default mapping rule. The terminal device may determine an appropriate CTU and perform grant-free transmission on the CTU. When different terminal devices perform grant-free transmission on a same CTU, that is, contending for a same CTU, a conflict occurs. The terminal device may determine, according to an indication of the network device, whether there is a conflict. For example, an asynchronous HARQ method may be used to resolve a problem caused by the conflict. However, if a quantity of conflicts exceeds a predetermined threshold, the network device may be requested to remap a CTU. The network device sends information about the remapped CTU to the terminal device, so that the terminal device performs grant-free transmission on the remapped CTU.

It should be understood that, for ease of description, FIG. 3 shows four CTU access regions. This embodiment of the present application is not limited thereto. More or less CTU access regions may be defined according to requirements.

The foregoing enumerated manner in which one CTU access region is multiplexed by multiple terminal devices is merely an example for description. The present application is not limited thereto. For example, when a few terminal devices exist in a system, one CTU access region may be used by only one terminal device for uplink transmission.

In this embodiment of the present application, the CTU access region may be used as the control time-frequency resource or the data time-frequency resource.

For ease of understanding and description, by way of example but not limitation, uplink transmission based on a CTU access region is used below to describe in detail a process of the method 200.

In this embodiment of the present application, a time-frequency resource (that is, an example of a transmission resource) for uplink transmission (grant-free transmission) may be divided into two parts: a data time-frequency resource and a control time-frequency resource.

The data time-frequency resource is used to carry data, and specifically, is used to generate a modulation symbol (that is, an example of a data symbol) after encoding processing and modulation processing are performed on the data.

The control time-frequency resource is used to carry control information, and specifically, is used to generate a modulation symbol (that is, an example of a control symbol) after encoding processing and modulation processing are performed on the control information. A function of the control information is described in detail as follows.

Figure 4:
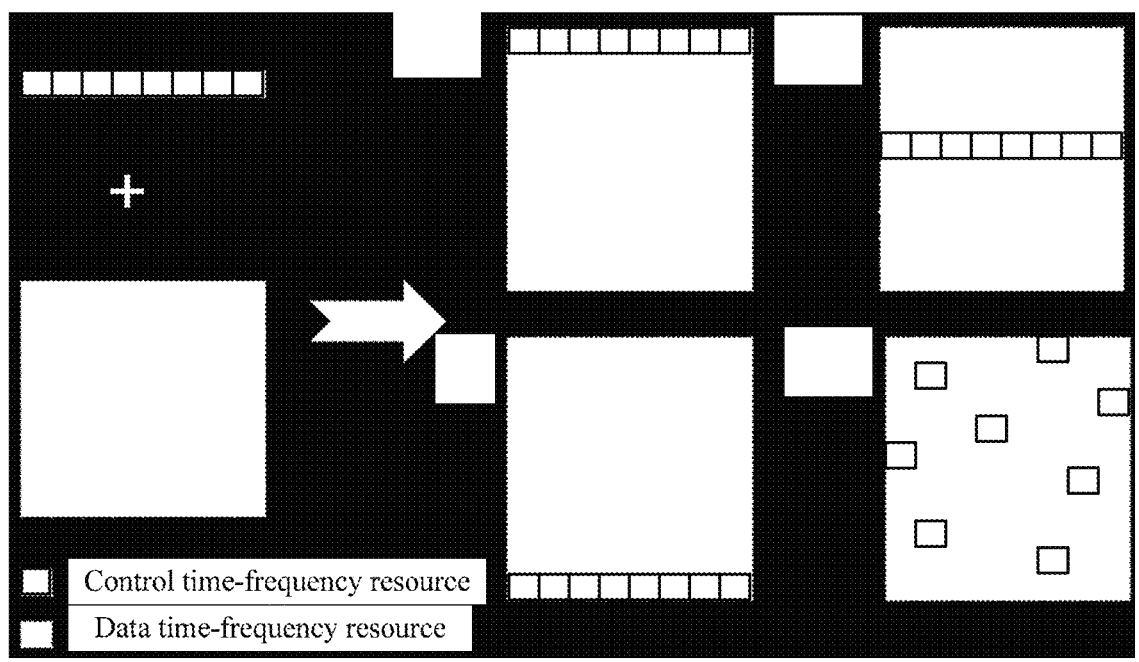
FIG. 4 is a schematic diagram of an example of distribution of a control time-frequency resource and a data time-frequency resource.

In this embodiment of the present application, the data time-frequency resource and the control time-frequency resource are mutually different. In addition, locations of the data time-frequency resource and the control time-frequency resource may be set at random. The present application is not specifically limited thereto. As shown in FIG. 4, for example, control time-frequency resources may be continuously distributed among the time-frequency resource in this embodiment of the present application; or control time-frequency resources may be discretely distributed among the time-frequency resource in this embodiment of the present application.

It should be understood that distribution of control time-frequency resources and data time-frequency resources in FIG. 4 is merely an example for description. The present application is not limited thereto, provided that locations of the control time-frequency resources or locations of the data time-frequency resources determined by the network device are the same as that determined by the terminal device.

The following describes in detail a manner in which the network device or the terminal device differentiates between a control time-frequency resource and a data time-frequency resource from a time-frequency resource provided by a system for uplink transmission.

Optionally, the method further includes:

sending indication information of the control time-frequency resource to the terminal device, where the indication information of the control time-frequency resource is used to indicate a location of the control time-frequency resource in multiple time-frequency resources included in the transmission resource.

Specifically, in this embodiment of the present application, the network device may determine control time-frequency resources (or data time-frequency resources) in the time-frequency resource provided by the system for uplink transmission, and delivers information (that is, an example of the indication information of the control time-frequency resources) about locations of the control time-frequency resources (or the data time-frequency resources) to the terminal device.

For example, in this embodiment of the present application, the time-frequency resources provided by the system for uplink transmission may be numbered. In addition, the network device may deliver a number (that is, an example of the indication information of the control time-frequency resource) of the control time-frequency resource (or the data time-frequency resource) to the terminal device. In this way, the terminal device may determine that a time-frequency resource corresponding to the received number is the control time-frequency resource (or the data time-frequency resource).

In addition, in this embodiment of the present application, a time at which the indication information of the control time-frequency resource is delivered may be determined at random, provided that the terminal device can obtain the indication information of the control time-frequency resource before performing uplink transmission. For example, the network device may periodically deliver the indication information of the control time-frequency resource to the terminal device by using a broadcast message or the like. For another example, when the terminal device is connected to the network device, the network device may deliver the indication information of the control time-frequency resource to the terminal device by using a broadcast message or the like.

Optionally, the indication information of the control time-frequency resource is specifically used to indicate that multiple control time-frequency resources are discretely distributed among the time-frequency resource.

Specifically, when the control time-frequency resources can be discretely distributed among the time-frequency resource, the network device may further indicate discrete distribution according to the indication information of the control time-frequency resource. For example, one bit such as "0" may be used to indicate that the control time-frequency resources are discretely distributed. In addition, the indication information of the control time-frequency resources may further indicate a discretion degree N of the control time-frequency resources, and the network device or the terminal device may determine the control time-frequency resources according to the following formula:

$$RE_{index}(m) = Ngm, m\varepsilon[0,1,\ldots,M]$$

where $RE_{index}(m)$ represents a number of a control time-frequency resource, and M represents a total quantity of time-frequency resources provided by the system for uplink transmission.

Optionally, the indication information of the multiple control time-frequency resource is specifically used to indicate that the control time-frequency resources are discretely distributed among the time-frequency resource.

Specifically, when the control time-frequency resources can be continuously distributed among the time-frequency resource, the network device may further indicate continuous distribution by using the indication information of the control time-frequency resource. For example, one bit such as "1" may be used to represent that the control time-frequency resources are continuously distributed.

It should be understood that the foregoing enumerated manner in which the network device or the terminal device differentiates between the control time-frequency resource and the data time-frequency resource from the time-frequency resource provided by the system for uplink transmission is merely an example for description. The present application is not limited thereto. For example, in this embodiment of the present application, control time-frequency resources and data time-frequency resources in the time-frequency resources may be stipulated in a standard. For another example, in this embodiment of the present application, a network administrator or an operator may notify the network device or the terminal device in advance of control time-frequency resources and data time-frequency resources in the time-frequency resources.

The following describes in detail a function of the control information transmitted by using the control time-frequency resource.

In this embodiment of the present application, the control information may be used to indicate a data encoding scheme. The data encoding scheme is an encoding scheme used when the terminal device performs encoding processing on uplink data. In this way, the network device may perform decoding processing on the data symbol according to the data encoding scheme indicated by the control information.

First, content of the data encoding scheme is described.

Optionally, the data encoding scheme includes a bit rate used when encoding processing is performed on the uplink data.

Specifically, in this embodiment of the present application, the encoding scheme may include the bit rate used during encoding processing.

It should be understood that the foregoing enumerated parameter or physical quantity used in the encoding scheme is merely an example for description. The present application is not limited thereto. For example, the encoding scheme may further include a type of encoding, such as Turbo coding, convolutional coding, polar coding.

In addition to the data encoding scheme, the network device may further need to learn of a modulation scheme (that is, a data modulation scheme) used when the terminal device performs modulation processing on the uplink data, so as to ensure reliability of uplink data transmission. That is, optionally, the method further includes:

performing demodulation processing on the data symbol according to a data modulation scheme used by the terminal device, to obtain the uplink data, where the data symbol is generated after the terminal device performs modulation processing on the uplink data according to the data modulation scheme used by the terminal device.

In this embodiment of the present application, the network device or the terminal device may determine the data modulation scheme in the following enumerated manners:

Manner 1

Optionally, the control information is further used to indicate the data modulation scheme.

Specifically, in this embodiment of the present application, the control information may be used to indicate the data modulation scheme. The data modulation scheme is a modulation scheme used when the terminal device performs modulation processing on uplink data. In this way, the network device may perform demodulation processing on the data symbol according to the data modulation scheme indicated by the control information.

Manner 2

Optionally, the control modulation scheme and the data modulation scheme are the same.

Specifically, in this embodiment of the present application, the control modulation scheme and the data modulation scheme are the same. Therefore, after determining the control modulation scheme (the determining process is described in detail hereinafter), the terminal device may perform modulation processing on uplink data by using the same scheme. Correspondingly, after determining the control modulation scheme, the network device may perform demodulation processing on a data symbol by using the same scheme.

Manner 3

Optionally, the data modulation scheme is determined according to a pilot resource used by the terminal device.

Specifically, in this embodiment of the present application, the data modulation scheme may be in a mapping relationship with a pilot resource provided by the system. Therefore, the network device or the terminal device may determine the data modulation scheme according to a pilot selected by the terminal device.

It should be understood that the foregoing enumerated methods for determining the data modulation scheme are merely examples for description. The present application is not limited thereto. All other solutions used to make the data demodulation scheme determined by the network device the same as that determined by the terminal device fall within the protection scope of the present application. For example, the data modulation scheme may be in a mapping relationship with a device identifier of the terminal device. Therefore, the network device or the terminal device may determine the data modulation scheme according to the identifier of the terminal device.

Manner 1 to manner 3 may be used individually or may be used together. The present application is not specifically limited thereto.

Content of the data modulation scheme is described below.

Optionally, the data modulation scheme includes at least one of a modulation order or a code domain resource used when modulation processing is performed on the uplink data.

Specifically, in this embodiment of the present application, the modulation scheme may include at least one of the modulation order or the code domain resource used in modulation processing.

For example, when a communications system uses only one code domain resource, the data modulation scheme may include only the modulation order.

For another example, when a communications system uses only one modulation order, the data modulation scheme may include only the code domain resource.

For another example, when a communications system can use multiple modulation orders and multiple code domain resources, the data modulation scheme may include both the modulation order and the code domain resource.

The code domain resource is described below.

Optionally, the code domain resource includes a sparse code multiple access SCMA codebook, a low-density signature LDS sequence, or a Code Division Multiple Access CDMA code.

Specifically, in this embodiment of the present application, the SCMA codebook, the LDS sequence, or the CDMA code may be used as the code domain resource. It should be understood that the foregoing enumerated specific examples of code domain resources are merely examples for description. The present application is not limited thereto. All other codebooks that can be used for transmission fall within the protection scope of the present application.

Optionally, the SCMA codebook includes at least two code words. The SCMA codebook is used to indicate a mapping relationship between at least two data combinations and the at least two code words. The code word is a multi-dimensional complex number vector, and is used to indicate a mapping relationship between data and multiple modulation symbols. The modulation symbol includes at least one zero modulation symbol and at least one non-zero modulation symbol.

Specifically, sparse code multiple access (SCMA) is a non-orthogonal multiple access technology. Certainly, persons skilled in the art may refer to this technology as another technical name instead of SCMA. In the technology, a codebook is used to transmit multiple different data streams on a same transmission resource. Different data streams use different codebooks to improve resource utilization. The data streams may come from a same terminal device or from different terminal devices.

The codebook used in the SCMA is a set of two or more code words.

A code word may be a multi-dimensional complex number vector having two or more dimensions, and is used to represent a mapping relationship between data and two or more modulation symbols. The mapping relationship may be a direct mapping relationship. The modulation symbol includes at least one zero modulation symbol and at least one non-zero modulation symbol, and the data may be binary bit data or non-binary data. Optionally, a relationship between the zero modulation symbol and the non-zero modulation symbol may be that a quantity of zero modulation symbols is not less than that of non-zero modulation symbols.

A codebook includes two or more code words. The codebook may represent a mapping relationship between a possible data combination of data of a specific length and a code word in the codebook. The mapping relationship may be a direct mapping relationship.

With the SCMA technology, data in a data stream is directly mapped to a code word, that is, a multi-dimensional complex number vector, in a codebook according to a mapping relationship, so that data is spread and sent on multiple resource units. The direct mapping relationship in the SCMA technology may be understood as follows: Mapping the data in the data stream to an intermediate modulation symbol is not required or another intermediate processing process is not required. The data herein may be binary bit data or non-binary data. The multiple resource units may be resource units in a time domain, a frequency domain, a space domain, a time-frequency domain, a time-space domain, or a time-frequency-space domain.

Code words used in the SCMA may be sparse. For example, a quantity of zero elements in the code word may be not less than a quantity of modulation symbols, so that a receive end can perform relatively low-complexity decoding by using multi-user detection technology. Herein, the relationship enumerated above between the quantity of zero elements and the quantity of modulation symbols is merely an example of sparseness description. The present application is not limited thereto. A ratio of the quantity of zero elements to the quantity of non-zero elements may be set at random.

In a communications system using the SCMA, multiple users multiplex a same time-frequency resource block to perform data transmission. Each resource block includes multiple resource REs. The RE herein may be a subcarrier-symbol unit in an OFDM technology, or may be a resource unit in the time domain or the frequency domain in another air interface technology. For example, in an SCMA system including L terminal devices, available resources are divided into several orthogonal time-frequency resource blocks, and each resource block includes U REs. The U REs may have a same location in the time domain. When sending data, first, a terminal device #L divides the to-be-sent data into data blocks of a size of S bits, and maps, by searching a codebook (which is determined by the network device and delivered to the terminal device), all data blocks to a modulation symbol sequence including U modulation symbols: X #L={X #L$_1$, X #L$_2$, . . . , X #L$_U$}. Each modulation symbol in the sequence is corresponding to one RE in the resource block. Then, a signal waveform is generated according to the modulation symbols. For the data blocks of the size of S bits, each codebook includes 2S different modulation symbol groups, which are corresponding to 2S possible data blocks.

The codebook may also be referred to as an SCMA codebook, which is a set of SCMA code words. The SCMA code word is a mapping relationship between an information bit and a modulation symbol. That is, the SCMA codebook is a set of the foregoing mapping relationships.

In addition, in the SCMA, in a group of modulation symbols X #k={X #k$_1$, X #k$_2$, . . . , X #k$_L$} corresponding to each terminal device, at least one symbol is a zero symbol and at least one symbol is non-zero symbol. That is, for data of a terminal device, in the L REs, only some REs (at least one RE) carry the data of the terminal device.

Figure 5:
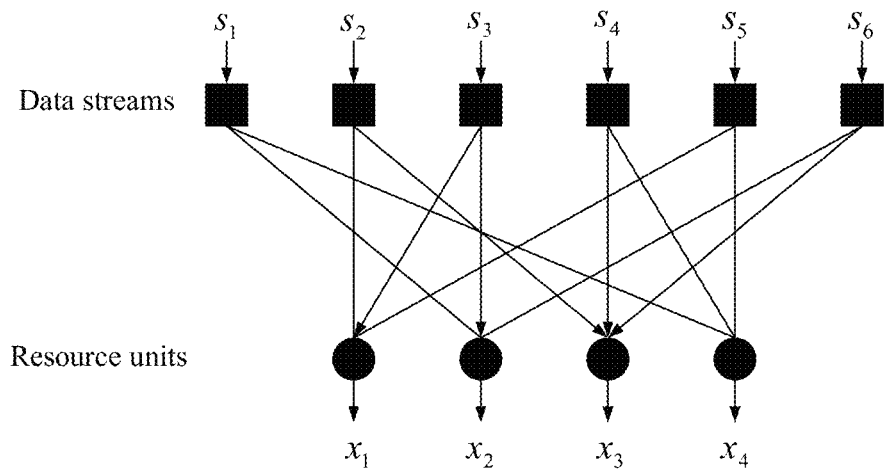
FIG. 5 is a schematic diagram of an uplink transmission encoding process according to an embodiment of the present application.

FIG. 5 shows a schematic diagram of bit mapping processing (or encoding processing) of the SCMA by using an example in which six data streams multiplex four resource units. As shown in FIG. 5, the six data streams form a group, and the four resource units form an encoding unit. A resource unit may be a subcarrier, an RE, or an antenna port. In FIG. 5, a connection line between a data stream and a resource unit indicates that after code word mapping is performed on at least one data combination of the data stream, a non-zero modulation symbol is sent on the resource unit. When there is no connection line between a data stream and a resource unit, it indicates that after code word mapping is performed on all possible data combinations of the data stream, all modulation symbols sent on the resource unit are zero. A data combination of a data stream may be understood according to the following description. For example, for a binary bit data stream, 00, 01, 10, and 11 are all possible two-bit data combinations. For ease of description, data of data streams is represented as s1 to s6, respectively, symbols sent on resource units are represented as x1 to x4, respectively, and a connection line between a data stream and a resource unit indicates that a modulation symbol is sent on the resource unit after data of the data stream is spread. The modulation symbol may be a zero symbol (corresponding to a zero element), or may be a non-zero symbol (corresponding to a non-zero element). When there is no connection line between a data stream and a resource unit, it indicates that no modulation symbol is sent on the resource unit after data of the data stream is spread.

It can be learned from FIG. 5 that data of each data stream is sent on multiple resource units after the data is spread. In addition, symbols sent on each resource unit are a superimposition of non-zero symbols that are obtained after data of multiple data streams is spread. For example, after data s3 of a data stream 3 is spread, non-zero symbols are sent on a resource unit 1 and a resource unit 2, and data x2 sent on a resource unit 3 is a superposition of non-zero symbols obtained after data s2 of a data stream 2, data s4 of a data stream 4, and data s6 of a data stream 6 are separately spread. A quantity of data streams may be greater than a quantity of resource units. Therefore, the SCMA system can effectively increase a network capacity, which includes a quantity of users that can be connected to a system, spectral efficiency, and the like.

A code word in the codebook generally has the following form:

$$\begin{pmatrix} c_{1,q} \\ c_{2,q} \\ M \\ c_{N,q} \end{pmatrix}.$$

In addition, a corresponding codebook generally has the following form:

$$\left\{ \begin{pmatrix} c_{1,1} \\ c_{2,1} \\ M \\ c_{N,1} \end{pmatrix}, \begin{pmatrix} c_{1,2} \\ c_{2,2} \\ M \\ c_{N,2} \end{pmatrix}, L, \begin{pmatrix} c_{1,Q_m} \\ c_{2,Q_m} \\ M \\ c_{N,Q_m} \end{pmatrix} \right\}$$

where N is a positive integer greater than 1, and may represent a quantity of resource units included in one encoding unit, or may be understood as a code word length; $Q_m$ is a positive integer greater than 1, represents a quantity of code words included in the codebook, and is corresponding to a modulation order, where, for example, when quadrature phase shift keying (QPSK) or 4-order modulation is used, $Q_m$ is 4; q represents the $q^{th}$ code word of $Q_m$ code words, q is a positive integer, and $1 \leq q \leq Q_m$; and an element $c_{n,q}$ included in the codebook and the code word is a complex number, and $c_{n,q}$ may be mathematically expressed as:

$$c_{n,q} \in \{0, \alpha^* \exp(j^*\beta)\}, 1 \leq n \leq N, 1 \leq q \leq Q_m$$

where α may be any real number, β may be any value, N and $Q_m$ may be positive integers.

In addition, a code word in a codebook and data form a mapping relationship. For example, a code word in a codebook and two-bit data form a mapping relationship.

For example, "00" may be corresponding to a code word 1, that is $$\begin{pmatrix} c_{1,1} \\ c_{2,1} \\ M \\ c_{N,1} \end{pmatrix};$$

"01" may be corresponding to a code word 2, that is, $$\begin{pmatrix} c_{1,2} \\ c_{2,2} \\ M \\ c_{N,2} \end{pmatrix};$$

"10" may be corresponding to a code word 3, that is, and $$\begin{pmatrix} c_{1,3} \\ c_{2,3} \\ M \\ c_{N,3} \end{pmatrix};$$

"11" may be corresponding to a code word 4, that is, $$\begin{pmatrix} c_{1,4} \\ c_{2,4} \\ M \\ c_{N,4} \end{pmatrix}.$$

With reference to FIG. 5, when there is a connection line between a data stream and a resource unit, a codebook corresponding to the data stream and a code word in the codebook has the following characteristic: At least one code word in the codebook is used to send a non-zero modulation symbol on the corresponding resource unit. For example, when there is a connection line between the data stream 3 and the resource unit 1, at least one code word in a codebook corresponding to the data stream 3 holds that $c_{1,q} \neq 0$, where $1 \leq q \leq Q_m$.

When there is no connection line between a data stream and a resource unit, a codebook corresponding to the data stream and a code word in the codebook has the following characteristic: All code words in the codebook are used to send a zero modulation symbol on the corresponding resource unit. For example, when there is no connection line between the data stream 3 and the resource unit 3, any code word in a codebook corresponding to the data stream 3 holds that $c_{3,q}=0$, where $1 \leq q \leq Q_m$.

In conclusion, when a modulation order is QPSK, the codebook corresponding to the data stream 3 in FIG. 5 may have the following form and characteristic:

$$\left\{ \begin{pmatrix} c_{1,1} \\ c_{2,1} \\ 0 \\ 0 \end{pmatrix}, \begin{pmatrix} c_{1,2} \\ c_{2,2} \\ 0 \\ 0 \end{pmatrix}, \begin{pmatrix} c_{1,3} \\ c_{2,3} \\ 0 \\ 0 \end{pmatrix}, \begin{pmatrix} c_{1,4} \\ c_{2,4} \\ 0 \\ 0 \end{pmatrix} \right\}$$

where $c_{n,q}=\alpha^*\exp(j^*\beta)$, $1 \leq n \leq 2$, $1 \leq q \leq 4$, α and β may be any real number; for any q, $1 \leq q \leq 4$; $c_{1,q}$ and $c_{2,q}$ are not zero at the same time; and at least one group of $q_1$ and $q_2$ holds $c_{1,q_1} \neq 0$ and $c_{2,q_2} \neq 0$, where $1 \leq q_1$ and $q_2 \leq 4$.

For example, if the data s3 of the data stream 3 is "10", according to the foregoing mapping rule, this data combination is mapped to a code word, that is, a four-dimensional complex number vector:

$$\begin{pmatrix} c_{1,3} \\ c_{2,3} \\ 0 \\ 0 \end{pmatrix}.$$

Optionally, the LDS sequence includes at least two signature sequences. The LDS sequence is used to indicate a mapping relationship between at least two data combinations and the at least two signature sequences. The signature sequence is a multi-dimensional complex number vector. The multi-dimensional complex number vector includes at least one zero element and at least one non-zero element. The signature sequence is used to perform amplitude and phase adjustment on a modulation symbol. The modulation symbol is obtained after constellation mapping is performed on data by using a modulation constellation.

Specifically, a low-density signature (LDS) technology is also a non-orthogonal multiple access and transmission technology. Certainly, the LDS technology may be referred to as another name in the communications field. This technology is used to add O (where O is an integer not less than 1) data streams from one or more users to P (where P is an integer not less than 1) subcarriers for transmission. Data of each data stream is spread onto the P subcarriers by means of sparse spread spectrum. When a value of O is greater than that of P, this technology can effectively increase a network capacity, which includes a quantity of users that can be connected to a system, spectral efficiency, and the like. Therefore, as an important non-orthogonal access technology, the LDS technology has drawn more attentions, and become an important candidate access technology for future wireless cellular network evolution.

As shown in FIG. 5, an example in which six data streams multiplex four resource units is used for description. That is, O=6, and P=4. O is a positive integer, and represents a quantity of data streams; and P is a positive integer, and represents a quantity of resource units. A resource unit may be a subcarrier, a resource element ("RE" for short), or an antenna port. The six data streams form a group, and the four resource units form an encoding unit.

In a bipartite graph shown in FIG. 5, a connection line between a data stream and a resource unit indicates that, after constellation mapping and amplitude and phase adjustment are performed on at least one data combination of the data stream, a non-zero modulation symbol is sent on the resource unit. When there is no connection line between a data stream and a resource unit, it indicates that after constellation mapping and amplitude and phase adjustment are performed on all possible data combinations of the data stream, all modulation symbols sent on the resource unit are zero modulation symbols. A data combination of a data stream may be understood according to the following description. For example, for a binary bit data stream, 00, 01, 10, and 11 are all possible data combinations of two-bit data. For ease of description, s1 to s6 in sequence represent to-be-sent data combinations of the six data streams in the bipartite graph, and x1 to x4 in sequence represent modulation symbols that are sent on the four resource units in the bipartite graph.

It can be learned from the bipartite graph that modulation symbols are sent on two or more resource units after constellation mapping and amplitude and phase adjustment are performed on a data combination of each data stream. In addition, the modulation symbol sent on each resource unit is superposition of modulation symbols that are obtained after constellation mapping and amplitude and phase adjustment are performed on each of data combinations of two or more data streams. For example, non-zero modulation symbols may be sent on a resource unit 1 and a resource unit 2 after constellation mapping and amplitude and phase adjustment are performed on a to-be-sent data combination s3 of a data stream 3. A modulation symbol x3 sent on a resource unit 3 is superposition of non-zero modulation symbols that are obtained after constellation mapping and amplitude and phase adjustment are performed on each of to-be-sent data combinations s2, s4, and s6 of a data stream 2, a data stream 4, and a data stream 6. A quantity of data streams may be greater than a quantity of resource units. Therefore, the non-orthogonal multiple access system can effectively increase a network capacity, which includes a quantity of users that can be connected to a system, spectral efficiency, and the like.

Figure 6:
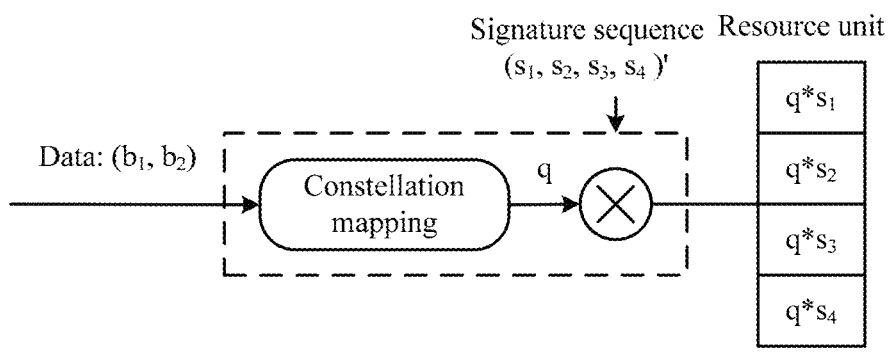
FIG. 6 is a schematic diagram of an LDS mapping process according to an embodiment of the present application.

Further, as shown in FIG. 6, a modulation symbol obtained after constellation mapping is performed on data (b1, b2) of a data stream is q. After phase and amplitude adjustment is performed on the modulation symbol q by using elements in a signature sequence, that is, adjustment factors, modulation symbols sent on resource units are obtained. The modulation symbols are q*s1, q*s2, q*s3, and q*s4, respectively.

It should be understood that the foregoing enumerated SCMA codebook and LDS sequence are merely examples of code domain resources. The present application is not limited thereto. Further, a CDMA code may be used as an example. Herein, a specific function and a using method of the CDMA code may be similar to those in the prior art. To avoid repetition, details are omitted herein.

In addition, the foregoing enumerated parameter or physical quantity used in the modulation scheme is merely an example for description. The present application is not limited thereto. All parameters and physical quantities used in the prior-art modulation processing fall within the protection scope of the present application.

Moreover, in addition to the foregoing enumerated data modulation scheme and the data encoding scheme, the control information may further indicate another parameter or physical quantity. For example, by way of example but not limitation, optionally, the control information is further used to indicate a device identifier of the terminal device.

The terminal device adds the device identifier of the terminal device to the control information. For example, when a terminal device uses multiple control time-frequency resources (for example, time-frequency resources corresponding to multiple CTU access regions) to transmit control information to improve diversity effects, a network device may determine, according to an identifier of a terminal device carried on control information that is carried on each control time-frequency resource, control information that belongs to a same terminal device, so as to improve processing efficiency and processing effects of the network device.

Methods for determining the data encoding scheme and the data modulation scheme by the terminal device are described below in detail.

By way of example but not limitation, for example, in this embodiment of the present application, the terminal device may randomly select an encoding scheme (for example, any bit rate) as an initial data encoding scheme. During uplink transmission, the terminal device may adjust the selected initial data encoding scheme according to a feedback result from the network device. For example, when the feedback result indicates that the network device does not correctly receive uplink data (for example, the network device feeds back a non-acknowledgement (NACK) message, or the network device does not feed back an acknowledgement (ACK) message), the terminal device may decrease the bit rate.

Similarly, the terminal device may randomly select a modulation scheme (for example, any modulation order) as an initial data modulation scheme. During uplink transmission, the terminal device may adjust the selected initial data modulation scheme according to a feedback result from the network device. For example, when the feedback result indicates that the network device cannot decode uplink data (for example, the network device feeds back a non-acknowledgement (NACK) message), the terminal device may decrease the modulation order.

It should be understood that the foregoing enumerated methods and processes for determining the data encoding scheme and the data modulation scheme by the terminal device are merely examples for description. The present application is not limited thereto. All other prior-art solutions used to determine the encoding scheme and the modulation scheme fall within the protection scope of the present application. For example, the terminal device may perform quality check on a channel used during uplink transmission, and determine the data encoding scheme and the data modulation scheme according to a check result.

A form of the control information is described below in detail.

Optionally, the control information is an index value that is corresponding to the data encoding scheme and the data modulation scheme used by the terminal device and that is determined by the terminal device according to mapping relationship information. The mapping relationship information is used to indicate a one-to-one mapping relationship between multiple parameter sets and multiple index values. Each parameter set includes a data encoding scheme and a data modulation scheme. Any two parameter sets are different in at least one of the data encoding scheme or the data modulation scheme.

In addition, optionally, the method further includes:

sending the mapping relationship information to the terminal device.

Specifically, in this embodiment of the present application, the network device may store an entry (that is, an example of the mapping relationship information) used to record the one-to-one mapping relationship between multiple parameter sets and multiple index values. The parameter set may include multiple parameters, such as the data encoding scheme and the data modulation scheme. It should be noted that parameter types included in the parameter set may be changed at random according to parameters and physical quantities that can be indicated by the control information. The following Table 1 shows an example of the entry.

TABLE 1

| Index value | Modulation order | Bit rate | Code domain resource (optional) | Mapping rule between a pilot and a code domain resource (optional) | ... |
|---|---|---|---|---|---|
| 0 | 2 | 0.5 | Low-density signature group | Rule 1 | ... |
| 1 | 2 | 0.5 | Low-density signature group | Rule 2 | ... |
| 2 | 2 | 0.5 | Code Division Multiple Access code group | Rule 1 | ... |
| 3 | 2 | 0.5 | Code Division Multiple Access code group | Rule 2 | ... |
| 4 | 2 | 0.8 | Low-density signature group | Rule 1 | ... |
| 5 | 2 | 0.8 | Low-density signature group | Rule 2 | ... |
| 6 | 2 | 0.8 | Code Division Multiple Access code group | Rule 1 | ... |
| 7 | 2 | 0.8 | Code Division Multiple Access code group | Rule 2 | ... |
| 8 | 4 | 0.5 | Low-density signature group | Rule 1 | ... |
| ... | ... | ... | ... | ... | ... |

It should be understood that types and specific values of the parameters or the physical quantities listed in Table 1 are merely examples for description. The present application is not limited thereto.

The network device may deliver the mapping relationship information (for example, Table 1) to the terminal device by using a broadcast message.

In this way, after determining the data encoding scheme and the data modulation scheme, the terminal device may search for, according to the types and the specific values of the parameters or the physical quantities in the data encoding scheme and the data modulation scheme, index values that are corresponding to the specific values and that are recorded in Table 1 to use the index values as the control information, and send the control information to the network device.

Correspondingly, the network device may search for, according to the received index values, the types and the specific values of the parameters or the physical quantities that are corresponding to the index values and that are recorded in Table 1, to use the types and the specific values of the parameters or the physical quantities as the data encoding scheme and the data modulation scheme that are used by the terminal device.

An index value is used as the control information, thereby reducing resources consumed for transmitting the control information, and improving transmission efficiency.

It should be understood that the foregoing enumerated manner in which the terminal device obtains the mapping relationship information is merely an example for description. The present application is not limited thereto, provided that the network device and the terminal device use a same mapping relationship. For example, an operator or a manufacturer may preconfigure the mapping relationship information on the terminal device.

In this embodiment of the present application, multiple terminal devices may multiplex a same control time-frequency resource to transmit the control information (that is, case 1). Alternatively, one control time-frequency resource (for example, a time-frequency resource corresponding to one or more CTU access regions) is used for control information transmission of only one terminal device (that is, case 2).

Manners of transmitting the control information in the foregoing two cases are described below in detail.

Case 1

Optionally, when one control time-frequency resource is used to transmit a control symbol of only one terminal device, the control time-frequency resource used by the terminal device is determined according to a pilot resource used when the terminal device transmits the control symbol.

For example, in this embodiment of the present application, each control time-frequency resource provided by a system and each pilot or each pilot set (that is, an example of the pilot resource) provided by the system may have a one-to-one mapping relationship. In this way, terminal devices that select different pilots can transmit the control information (or the control symbol) by using different control time-frequency resources.

Specifically, the network device or the terminal device may determine, according to the following formula, a control time-frequency resource used by the terminal device:

$$RE_{index} = (RS_{index} - 1) * k + 1 \sim RS_{index} * k$$

where $RE_{index}(m)$ represents a number of the control time-frequency resource used by the terminal device, $RS_{index}$ represents a number of the pilot resource selected by the terminal device, and k represents a quantity of CTU access regions occupied by the control time-frequency resource used by the terminal device.

It should be understood that the foregoing enumerated manner in which the control time-frequency resource is determined by using the pilot resource is merely an example for description. The present application is not limited thereto. For example, each control time-frequency resource provided by the system and information determined according to each device identifier (for example, when the device identifier is a decimal number, the information may be a value obtained after a MOD operation is performed on a defined threshold by using each device identifier) may have a one-to-one mapping relationship. In this way, different terminal devices can transmit the control information (or the control symbol) by using different control time-frequency resources. Herein, a device identifier may be, for example, a Media Access Control (MAC) address of the terminal device, or a phone number, or another identifier that can be used to uniquely identify the terminal device.

Optionally, the method further includes:

sending non-multiplexing mode information to the terminal device, where the non-multiplexing mode information is used to indicate that one control time-frequency resource is used to transmit a control symbol of only one terminal device.

Specifically, when one control time-frequency resource (including a time-frequency resource of one or more CTU access regions) is used to transmit a control symbol of only one terminal device, the network device my further use the non-multiplexing mode information to indicate the mode. For example, one bit such as "1" may be used to represent that one control time-frequency resource is used to transmit a control symbol of only one terminal device.

Case 2

When one control time-frequency resource can be used to transmit control symbols of multiple terminal devices, different code domain resources are used when the multiple terminal devices generate the control symbols.

Specifically, in this embodiment of the present application, the multiple terminal devices may transmit the control information by means of code division multiplexing by using a same control time-frequency resource (including a time-frequency resource of one or more CTU access regions). That is, the multiple terminal devices each use a different code domain resource (for example, a CDMA code, an LDS sequence, an SCMA codebook).

The method further includes:

sending multiplexing mode information to the terminal device, where the multiplexing mode information is used to indicate that one control time-frequency resource can be used to transmit control symbols of multiple terminal devices.

Specifically, when one control time-frequency resource (including a time-frequency resource of one or more CTU access regions) can be used to transmit control symbols of multiple terminal devices, the network device my further use the multiplexing mode information to indicate the mode. For example, one bit such as "1" may be used to represent that one control time-frequency resource can be used to transmit control symbols of multiple terminal devices.

The control information is uplink information that is sent by the terminal device to the network device. Therefore, to transmit the control information correctly, the network device needs to learn of an encoding scheme (that is, the control encoding scheme) and a modulation scheme (that is, the control modulation scheme) of the control information.

That is, as described above, after determining the control information used by the terminal device and the control time-frequency resource that is used to carry the control information of the terminal device, the terminal device may select an encoding scheme (that is, the control encoding scheme) and a modulation scheme (that is, the control modulation scheme) to perform encoding processing and modulation processing on the control information used by the terminal device, to generate a control symbol, and send the control symbol by using the control time-frequency resource used by the terminal device.

Correspondingly, after receiving the control symbol on the control time-frequency resource used by the terminal device, the network device may determine the control encoding scheme and the control modulation scheme that are used by the terminal device, and perform decoding processing and demodulation processing on the control symbol according to a corresponding decoding scheme and a corresponding demodulation scheme, to obtain the control information.

In this embodiment of the present application, the terminal device and the network device may stipulate a manner, so that a control encoding scheme and a control modulation scheme determined by the terminal device are the same as those determined by the network device.

In this embodiment of the present application, control encoding schemes used by all terminal devices in the communications system may be the same. For example, a relatively low bit rate may be used.

By way of example but not limitation, in this embodiment of the present application, the control encoding scheme may be a convolutional code of a bit rate 1/3.

Similarly, control modulation schemes used by all terminal devices in the communications system may be the same. For example, a relatively low modulation order may be used.

By way of example but not limitation, in this embodiment of the present application, the control modulation scheme may be a four-point SCMA codebook, and a modulation order is 2.

Alternatively, optionally, the control encoding scheme and the control modulation scheme that are used by the terminal device are determined according to a pilot resource used when the terminal device transmits the control symbol.

Specifically, in this embodiment of the present application, control encoding schemes used by all terminal devices in the communications system may be different.

In this case, each control encoding scheme provided by the system and a pilot or a pilot set (an example of a pilot resource) provided by the system may be in a one-to-one mapping relationship. In this way, terminal devices that select different pilots can perform encoding processing on the control information by using different control encoding schemes.

It should be understood that, the foregoing enumerated manner in which the pilot resource is used to determine the control time-frequency resource is merely an example for description. The present application is not limited thereto. For example, each control time-frequency resource provided by the system and information determined according to each device identifier may have a one-to-one mapping relationship. In this way, different terminal devices can perform encoding processing on the control information by using different control encoding schemes.

Similarly, in this embodiment of the present application, control modulation schemes that are used by all terminal devices in the communications system may be different.

In this case, each control modulation scheme provided by the system and each pilot or each pilot set (that is, an example of the pilot resource) provided by the system may be in a one-to-one mapping relationship. In this way, terminal devices that select different pilots can perform modulation processing on the control information by using different control modulation schemes.

It should be understood that, the foregoing enumerated manner in which the pilot resource is used to determine the control time-frequency resource is merely an example for description. The present application is not limited thereto. For example, each control time-frequency resource provided by the system and information determined according to each device identifier may have a one-to-one mapping relationship. In this way, different terminal devices can perform modulation processing on the control information by using different control modulation schemes.

Therefore, the network device and the terminal device can determine, by means of negotiation by using the control information carried on the control time-frequency resource, a data encoding scheme and a data modulation scheme of uplink data that is carried on the data time-frequency resource.

Then, the network device or the terminal device may transmit the uplink data according to the data encoding scheme and the data modulation scheme. In addition, the process is similar to that in the prior art. To avoid repetition, detailed descriptions are omitted herein.

It should be noted that, in this embodiment of the present application, the control encoding scheme and the control modulation scheme that are used by the terminal device may be an encoding scheme or a modulation scheme predefined in the communications system or in a communications protocol.

According to the uplink data transmission method in this embodiment of the present application, a time-frequency resource used for uplink transmission is divided into a control time-frequency resource and a data time-frequency resource. A network device and a terminal device agree to use a control encoding scheme and a control modulation scheme that are specific to information carried on the control time-frequency resource. After determining a data encoding scheme specific to uplink data, the terminal device performs, according to the agreed control encoding scheme and control modulation scheme, encoding processing and modulation processing on control information that indicates the data encoding scheme, to generate a control symbol. Correspondingly, the network device can perform demodulation processing and decoding processing on the control symbol according to the agreed control encoding scheme and control modulation scheme, to obtain the control information, and determine the uplink data encoding scheme indicated by the control information. This can implement negotiation of an uplink data encoding scheme without notification from the network device, improve flexibility of uplink transmission, and improve reliability of a grant-free transmission solution.

With reference to FIG. 1 to FIG. 6, the uplink data transmission method is described above in detail according to the embodiments of the present application from a perspective of a network device. With reference to FIG. 7, an uplink data transmission method is described below in detail according to an embodiment of the present application from a perspective of a terminal device.

FIG. 7 is a schematic flowchart of an uplink data transmission method 400 according to this embodiment of the present application from the perspective of the terminal device. As shown in FIG. 7, the method 400 includes the following steps:

S410. The terminal device performs encoding and modulation processing on control information according to a control encoding scheme and a control modulation scheme that are used by the terminal device, to obtain a control symbol, where the control information is used to indicate a data encoding scheme used by the terminal device.

S420. Send the control symbol to a network device by using a control time-frequency resource, and send a data symbol to the network device by using a data time-frequency resource, where the control time-frequency resource and the data time-frequency resource belong to a transmission resource that is used for uplink transmission, the control time-frequency resource and the data time-frequency resource are different, and the data symbol is generated after the terminal device performs encoding processing on uplink data according to the data encoding scheme used by the terminal device.

Optionally, the data symbol is sent by the terminal device to the network device in a grant-free transmission mode. The grant-free transmission means that the network device pre-allocates multiple transmission resources and notifies the terminal device of the multiple transmission resources, so that the terminal device selects at least one transmission resource from the multiple transmission resources when having an uplink data transmission requirement, and sends the uplink data by using the selected transmission resource.

Optionally, the control encoding scheme includes a bit rate used when encoding processing is performed on the control information, and the control modulation scheme includes a modulation order and a code domain resource that are used when modulation processing is performed on the control information.

Optionally, the control encoding scheme and the control modulation scheme that are used by the terminal device are determined according to a pilot resource used when the terminal device transmits the control symbol.

Optionally, the data encoding scheme used by the terminal device includes a bit rate used when the terminal device performs encoding processing on the uplink data.

Optionally, the data symbol is generated after the terminal device performs modulation processing on the uplink data according to a data modulation scheme used by the terminal device.

Optionally, the data modulation scheme used by the terminal device includes a modulation order and a code domain resource that are used when the terminal device performs modulation processing on the uplink data.

Optionally, the control modulation scheme used by the terminal device is the same as the data modulation scheme used by the terminal device.

Optionally, the data modulation scheme used by the terminal device is determined according to a pilot resource used by the terminal device.

Optionally, the control information is further used to indicate the data modulation scheme used by the terminal device.

Optionally, the control information is an index value corresponding to the data encoding scheme and the data modulation scheme that are used by the terminal device, and the control information is determined by the terminal device according to mapping relationship information. The mapping relationship information is used to indicate a one-to-one mapping relationship between multiple parameter sets and multiple index values. Each parameter set includes a data encoding scheme and a data modulation scheme. Any two parameter sets are different in at least one of the data encoding scheme or the data modulation scheme.

Optionally, the method further includes:
receiving the mapping relationship information sent by the network device.

Optionally, the method further includes:
receiving indication information of the control time-frequency resource sent by the network device, where the indication information of the control time-frequency resource is used to indicate a location of the control time-frequency resource in multiple time-frequency resources included in the transmission resource; and
determining the control time-frequency resource from the multiple time-frequency resources according to the indication information of the control time-frequency resource.

Optionally, the indication information of the control time-frequency resource is specifically used to indicate that multiple control time-frequency resources are continuously distributed among the multiple time-frequency resources; or
the indication information of the control time-frequency resource is specifically used to indicate that multiple control time-frequency resources are discretely distributed among the multiple time-frequency resources.

Optionally, when one control time-frequency resource is used to transmit a control symbol of only one terminal device, the control time-frequency resource used when the terminal device transmits the control symbol is determined according to the pilot resource used when the terminal device transmits the control symbol.

Optionally, the method further includes:

receiving non-multiplexing mode information sent by the network device, where the non-multiplexing mode information is used to indicate that one control time-frequency resource is used to transmit a control symbol of only one terminal device.

Optionally, when one control time-frequency resource can be used to transmit control symbols of multiple terminal devices, different code domain resources are used when the multiple terminal devices generate the control symbols.

Optionally, the method further includes:

receiving multiplexing mode information sent by the network device, where the multiplexing mode information is used to indicate that one control time-frequency resource can be used to transmit control symbols of multiple terminal devices.

Optionally, the control information is further used to indicate a device identifier of the terminal device.

Optionally, the network device is a base station, and the terminal device is user equipment.

Actions of the terminal device in the method 400 are similar to those of the terminal device in the method 200. In addition, actions of the network device in the method 400 are similar to those of the network device in the method 200. Herein, to avoid repetition, details are omitted.

According to the uplink data transmission method in this embodiment of the present application, a time-frequency resource used for uplink transmission is divided into a control time-frequency resource and a data time-frequency resource. A network device and a terminal device agree to use a control encoding scheme and a control modulation scheme that are specific to information carried on the control time-frequency resource. After determining a data encoding scheme specific to uplink data, the terminal device performs, according to the agreed control encoding scheme and control modulation scheme, encoding processing and modulation processing on control information that indicates the data encoding scheme, to generate a control symbol. Correspondingly, the network device can perform demodulation processing and decoding processing on the control symbol according to the agreed control encoding scheme and control modulation scheme, to obtain the control information, and determine the uplink data encoding scheme indicated by the control information. This can implement negotiation of an uplink data encoding scheme without notification from the network device, improve flexibility of uplink transmission, and improve reliability of a grant-free transmission solution.

The uplink data transmission methods according to the embodiments of the present application are described above in detail with reference to FIG. 1 to FIG. 7. Uplink data transmission apparatuses according to embodiments of the present application are described below in detail with reference to FIG. 8 and FIG. 9.

FIG. 8 is a schematic block diagram of an uplink data transmission apparatus 500 according to an embodiment of the present application. As shown in FIG. 8, the apparatus 500 includes:

a receiving unit 510, configured to receive a control symbol sent by a terminal device by using a control time-frequency resource, where the control symbol is generated after the terminal device performs encoding and modulation processing on control information according to a control encoding scheme and a control modulation scheme that are used by the terminal device, the control information is used to indicate a data encoding scheme used by the terminal device, the control time-frequency resource belongs to a transmission resource that is used for uplink transmission, the transmission resource further includes a data time-frequency resource, and the control time-frequency resource and the data time-frequency resource are different; and a processing unit 520, configured to: perform demodulation and decoding processing on the control symbol according to the control encoding scheme and the control modulation scheme that are used by the terminal device, to obtain the control information; and perform, according to the control information, decoding processing on the data symbol that is sent by using the data time-frequency resource by the terminal device, to obtain uplink data, where the data symbol is generated after the terminal device performs encoding processing on the uplink data according to the data encoding scheme used by the terminal device.

Optionally, the data symbol is sent by the terminal device to the apparatus in a grant-free transmission mode. The grant-free transmission means that the network device (for example, apparatus 500) preallocates multiple transmission resources and notifies the terminal device of the multiple transmission resources, so that the terminal device selects at least one transmission resource from the multiple transmission resources when having an uplink data transmission requirement, and sends the uplink data by using the selected transmission resource.

Optionally, the control encoding scheme includes a bit rate used when encoding processing is performed on the control information, and the control modulation scheme includes a modulation order and a code domain resource that are used when modulation processing is performed on the control information.

Optionally, the control encoding scheme and the control modulation scheme that are used by the terminal device are determined according to a pilot resource used when the terminal device transmits the control symbol.

Optionally, the data encoding scheme used by the terminal device includes a bit rate used when the terminal device performs encoding processing on the uplink data.

Optionally, the processing unit is further configured to perform demodulation processing on the data symbol according to a data modulation scheme used by the terminal device, to obtain the uplink data. The data symbol is generated after the terminal device performs modulation processing on the uplink data according to the data modulation scheme used by the terminal device.

Optionally, the data modulation scheme used by the terminal device includes a modulation order and a code domain resource that are used when the terminal device performs modulation processing on the uplink data.

Optionally, the control modulation scheme used by the terminal device is the same as the data modulation scheme used by the terminal device.

Optionally, the data modulation scheme used by the terminal device is determined according to a pilot resource used by the terminal device.

Optionally, the control information is further used to indicate the data modulation scheme used by the terminal device.

Optionally, the control information is an index value corresponding to the data encoding scheme and the data modulation scheme that are used by the terminal device, and the control information is determined by the terminal device according to mapping relationship information. The mapping relationship information is used to indicate a one-to-one mapping relationship between multiple parameter sets and multiple index values. Each parameter set includes a data encoding scheme and a data modulation scheme. Any two parameter sets are different in at least one of the data encoding scheme or the data modulation scheme.

Optionally, the apparatus further includes a transmission unit, connected to the processing unit.

The processing unit is further configured to control the transmission unit to send the mapping relationship information to the terminal device.

Optionally, the apparatus further includes a transmission unit, connected to the processing unit.

The processing unit is further configured to control the transmission unit to send indication information of the control time-frequency resource to the terminal device. The indication information of the control time-frequency resource is used to indicate a location of the control time-frequency resource in multiple time-frequency resources included in the transmission resource.

Optionally, the indication information of the control time-frequency resource is specifically used to indicate that multiple control time-frequency resources are continuously distributed among the multiple time-frequency resources; or the indication information of the control time-frequency resource is specifically used to indicate that multiple control time-frequency resources are discretely distributed among the multiple time-frequency resources.

Optionally, when one control time-frequency resource is used to transmit a control symbol of only one terminal device, the control time-frequency resource used when the terminal device transmits the control symbol is determined according to the pilot resource used when the terminal device transmits the control symbol.

Optionally, the apparatus further includes a transmission unit, connected to the processing unit.

The processing unit is further configured to control the transmission unit to send non-multiplexing mode information to the terminal device. The non-multiplexing mode information is used to indicate that one control time-frequency resource is used to transmit a control symbol of only one terminal device.

Optionally, when one control time-frequency resource can be used to transmit control symbols of multiple terminal devices, different code domain resources are used when the multiple terminal devices generate the control symbols.

Optionally, the apparatus further includes a transmission unit, connected to the processing unit.

The processing unit is further configured to control the transmission unit to send multiplexing mode information to the terminal device. The multiplexing mode information is used to indicate that one control time-frequency resource can be used to transmit control symbols of multiple terminal devices.

Optionally, the control information is further used to indicate a device identifier of the terminal device.

Optionally, the apparatus is a base station, and the terminal device is user equipment.

The uplink data transmission apparatus 500 in this embodiment of the present application may be corresponding to the network device in the method embodiments of the present application. In addition, units, namely, modules in the uplink data transmission apparatus 500 and other operations and/or functions described above are separately used to implement corresponding procedures in the method 200 in FIG. 2. For brevity, details are not further described herein.

According to the uplink data transmission apparatus in this embodiment of the present application, a time-frequency resource used for uplink transmission is divided into a control time-frequency resource and a data time-frequency resource. A network device and a terminal device agree to use a control encoding scheme and a control modulation scheme that are specific to information carried on the control time-frequency resource. After determining a data encoding scheme specific to uplink data, the terminal device performs, according to the agreed control encoding scheme and control modulation scheme, encoding processing and modulation processing on control information that indicates the data encoding scheme, to generate a control symbol. Correspondingly, the network device can perform demodulation processing and decoding processing on the control symbol according to the agreed control encoding scheme and control modulation scheme, to obtain the control information, and determine the uplink data encoding scheme indicated by the control information. This can implement negotiation of an uplink data encoding scheme without notification from the network device, improve flexibility of uplink transmission, and improve reliability of a grant-free transmission solution.

Figure 9:
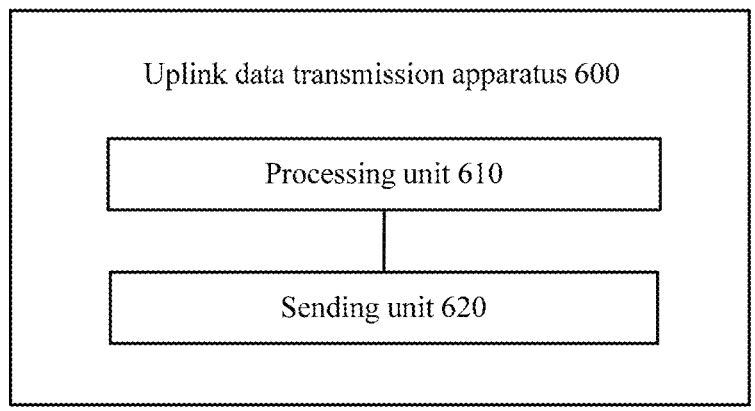
FIG. 9 is a schematic structural diagram of an uplink data transmission apparatus according to another embodiment of the present application.

FIG. 9 is a schematic block diagram of an uplink data transmission apparatus 600 according to an embodiment of the present application. As shown in FIG. 9, the apparatus 600 includes:

a processing unit 610, configured to perform encoding and modulation processing on control information according to a control encoding scheme and a control modulation scheme that are corresponding to the apparatus, to obtain a control symbol, where the control information is used to indicate a data encoding scheme corresponding to the apparatus; and a sending unit 620, configured to send the control symbol to a network device by using a control time-frequency resource, and send a data symbol to the network device by using a data time-frequency resource, where the control time-frequency resource and the data time-frequency resource belong to a transmission resource that is used for uplink transmission, the control time-frequency resource and the data time-frequency resource are different, and the data symbol is generated after the apparatus performs encoding processing on uplink data according to the data encoding scheme corresponding to the apparatus.

Optionally, the data symbol is sent by the apparatus to the network device in a grant-free transmission mode. The grant-free transmission means that the network device pre-allocates multiple transmission resources and notifies the terminal device (for example, the apparatus 600) of the multiple transmission resources, so that the apparatus selects at least one transmission resource from the multiple transmission resources when having an uplink data transmission requirement, and sends the uplink data by using the selected transmission resource.

Optionally, the control encoding scheme includes a bit rate used when encoding processing is performed on the control information, and the control modulation scheme includes a modulation order and a code domain resource that are used when modulation processing is performed on the control information.

Optionally, the control encoding scheme and the control modulation scheme that are corresponding to the apparatus are determined according to a pilot resource used when the apparatus transmits the control symbol.

Optionally, the data encoding scheme corresponding to the apparatus includes a bit rate used when the apparatus performs encoding processing on the uplink data.

Optionally, the data symbol is generated after the apparatus performs modulation processing on the uplink data according to a data modulation scheme corresponding to the apparatus.

Optionally, the data modulation scheme corresponding to the apparatus includes a modulation order and a code domain resource that are used when modulation processing is performed on the uplink data by the apparatus.

Optionally, the control modulation scheme corresponding to the apparatus and the data modulation scheme corresponding to the apparatus are the same.

Optionally, the data modulation scheme corresponding to the apparatus is determined according to a pilot resource corresponding to the apparatus.

Optionally, the control information is further used to indicate the data modulation scheme corresponding to the apparatus.

Optionally, the control information is an index value corresponding to the data encoding scheme and the data modulation scheme that are corresponding to the apparatus. The control information is determined by the apparatus according to mapping relationship information. The mapping relationship information is used to indicate a one-to-one mapping relationship between multiple parameter sets and multiple index values. Each parameter set includes a data encoding scheme and a data modulation scheme. Any two parameter sets are different in at least one of the data encoding scheme or the data modulation scheme.

Optionally, the apparatus further includes a receiving unit, connected to the processing unit.

The processing unit is further configured to control the receiving unit to receive the mapping relationship information sent by the network device.

Optionally, the apparatus further includes a receiving unit, connected to the processing unit.

The processing unit is further configured to control the receiving unit to receive indication information of the control time-frequency resource sent by the network device. The indication information of the control time-frequency resource is used to indicate a location of the control time-frequency resource in multiple time-frequency resources included in the transmission resource; and configured to determine the control time-frequency resource from the multiple time-frequency resources according to the indication information of the control time-frequency resource.

Optionally, the indication information of the control time-frequency resource is specifically used to indicate that multiple control time-frequency resources are continuously distributed among the multiple time-frequency resources; or the indication information of the control time-frequency resource is specifically used to indicate that multiple control time-frequency resources are discretely distributed among the multiple time-frequency resources.

Optionally, when one control time-frequency resource is used to transmit a control symbol of only one device, the control time-frequency resource used when the apparatus transmits the control symbol is determined according to the pilot resource used when the apparatus transmits the control symbol.

Optionally, the apparatus further includes a receiving unit, connected to the processing unit.

The processing unit is further configured to control the receiving unit to receive non-multiplexing mode information sent by the network device. The non-multiplexing mode information is used to indicate that one control time-frequency resource is used to transmit a control symbol of only one device.

Optionally, when one control time-frequency resource can be used to transmit control symbols of multiple devices, different code domain resources are used when the multiple devices generate the control symbols.

Optionally, the apparatus further includes a receiving unit, connected to the processing unit.

The processing unit is further configured to control the receiving unit to receive multiplexing mode information sent by the network device. The multiplexing mode information is used to indicate that one control time-frequency resource can be used to transmit control symbols of multiple devices.

Optionally, the control information is further used to indicate a device identifier of the apparatus.

Optionally, the network device is a base station, and the apparatus is user equipment.

The uplink data transmission apparatus 600 in this embodiment of the present application may be corresponding to the terminal device in the method embodiments of the present application. In addition, units, namely, modules in the uplink data transmission apparatus 600 and other operations and/or functions described above are separately used to implement corresponding procedures in the method 400 in FIG. 7. For brevity, details are not further described herein.

According to the uplink data transmission apparatus in this embodiment of the present application, a time-frequency resource used for uplink transmission is divided into a control time-frequency resource and a data time-frequency resource. A network device and a terminal device agree to use a control encoding scheme and a control modulation scheme that are specific to information carried on the control time-frequency resource. After determining a data encoding scheme specific to uplink data, the terminal device performs, according to the agreed control encoding scheme and control modulation scheme, encoding processing and modulation processing on control information that indicates the data encoding scheme, to generate a control symbol. Correspondingly, the network device can perform demodulation processing and decoding processing on the control symbol according to the agreed control encoding scheme and control modulation scheme, to obtain the control information, and determine the uplink data encoding scheme indicated by the control information. This can implement negotiation of an uplink data encoding scheme without notification from the network device, improve flexibility of uplink transmission, and improve reliability of a grant-free transmission solution.

The uplink data transmission methods according to the embodiments of the present application are described above in detail with reference to FIG. 1 to FIG. 7. Uplink data transmission devices according to embodiments of the present application are described below in detail with reference to FIG. 10 and FIG. 11.

Figure 10:
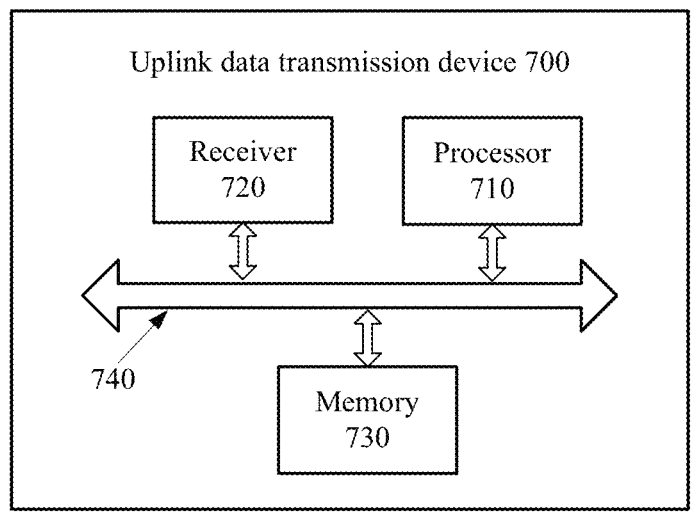
FIG. 10 is a schematic structural diagram of an uplink data transmission device according to an embodiment of the present application.

FIG. 10 is a schematic block diagram of an uplink data transmission device 700 according to an embodiment of the present application. As shown in FIG. 10, the device 700 includes a processor 710 and a receiver 720, and the processor 710 is connected to the receiver 720. Optionally, the device 700 further includes a memory 730, and the memory 730 is connected to the processor 710. Further, optionally, the device 700 includes a bus system 740. The processor 710, the receiver 720, and the memory 730 may be connected by using the bus system 740. The memory 730 may be configured to store an instruction. The processor 710 is configured to execute the instruction stored in the memory 730, so as to control the receiver 720 to receive information or a signal.

The processor 710 is configured to control the receiver 720 to receive a control symbol sent by a terminal device by using a control time-frequency resource, where the control symbol is generated after the terminal device performs encoding and modulation processing on control information according to a control encoding scheme and a control modulation scheme that are used by the terminal device, the control information is used to indicate a data encoding scheme used by the terminal device, the control time-frequency resource belongs to a transmission resource that is used for uplink transmission, the transmission resource further includes a data time-frequency resource, and the control time-frequency resource and the data time-frequency resource are different;

configured to perform demodulation and decoding processing on the control symbol according to the control encoding scheme and the control modulation scheme that are used by the terminal device, to obtain the control information; and configured to perform, according to the control information, decoding processing on a data symbol sent by the terminal device by using the data time-frequency resource, to obtain uplink data, where the data symbol is generated after the terminal device performs encoding processing on the uplink data according to the data encoding scheme used by the terminal device.

Optionally, the data symbol is sent by the terminal device to the device in a grant-free transmission mode. The grant-free transmission means that the device preallocates multiple transmission resources and notifies the terminal device of the multiple transmission resources, so that the terminal device selects at least one transmission resource from the multiple transmission resources when having an uplink data transmission requirement, and sends the uplink data by using the selected transmission resource.

Optionally, the control encoding scheme includes a bit rate used when encoding processing is performed on the control information, and the control modulation scheme includes a modulation order and a code domain resource that are used when modulation processing is performed on the control information.

Optionally, the control encoding scheme and the control modulation scheme that are used by the terminal device are determined according to a pilot resource used when the terminal device transmits the control symbol.

Optionally, the data encoding scheme used by the terminal device includes a bit rate used when the terminal device performs encoding processing on the uplink data.

Optionally, the processor is further configured to perform demodulation processing on the data symbol according to a data modulation scheme used by the terminal device, to obtain the uplink data. The data symbol is generated after the terminal device performs modulation processing on the uplink data according to the data modulation scheme used by the terminal device.

Optionally, the data modulation scheme used by the terminal device includes a modulation order and a code domain resource that are used when the terminal device performs modulation processing on the uplink data.

Optionally, the control modulation scheme used by the terminal device is the same as the data modulation scheme used by the terminal device.

Optionally, the data modulation scheme used by the terminal device is determined according to a pilot resource used by the terminal device.

Optionally, the control information is further used to indicate the data modulation scheme used by the terminal device.

Optionally, the control information is an index value corresponding to the data encoding scheme and the data modulation scheme that are used by the terminal device, and the control information is determined by the terminal device according to mapping relationship information. The mapping relationship information is used to indicate a one-to-one mapping relationship between multiple parameter sets and multiple index values. Each parameter set includes a data encoding scheme and a data modulation scheme. Any two parameter sets are different in at least one of the data encoding scheme or the data modulation scheme.

Optionally, the device further includes a transmitter, connected to the processor.

The processor is further configured to control the transmitter to send the mapping relationship information to the terminal device.

Optionally, the device further includes a transmitter, connected to the processor.

The processor is further configured to control the transmitter to send indication information of the control time-frequency resource to the terminal device. The indication information of the control time-frequency resource is used to indicate a location of the control time-frequency resource in multiple time-frequency resources included in the transmission resource.

Optionally, the indication information of the control time-frequency resource is specifically used to indicate that multiple control time-frequency resources are continuously distributed among the multiple time-frequency resources; or the indication information of the control time-frequency resource is specifically used to indicate that multiple control time-frequency resources are discretely distributed among the multiple time-frequency resources.

Optionally, when one control time-frequency resource is used to transmit a control symbol of only one terminal device, the control time-frequency resource used when the terminal device transmits the control symbol is determined according to the pilot resource used when the terminal device transmits the control symbol.

Optionally, the device further includes a transmitter, connected to the processor.

The processor is further configured to control the transmitter to send non-multiplexing mode information to the terminal device. The non-multiplexing mode information is used to indicate that one control time-frequency resource is used to transmit a control symbol of only one terminal device.

Optionally, when one control time-frequency resource can be used to transmit control symbols of multiple terminal devices, different code domain resources are used when the multiple terminal devices generate the control symbols.

Optionally, the device further includes a transmitter, connected to the processor.

The processor is further configured to control the transmitter to send multiplexing mode information to the terminal device. The multiplexing mode information is used to indicate that one control time-frequency resource can be used to transmit control symbols of multiple terminal devices.

Optionally, the control information is further used to indicate a device identifier of the terminal device.

Optionally, the device is a base station, and the terminal device is user equipment.

It should be understood that, in this embodiment of the present application, the processor 710 may be a central processing unit ("CPU" for short). The processor 710 may be another general-purpose processor, a digital signal processor (DSP), an application-specific integrated circuit (ASIC), a field programmable gate array (FPGA) or other programmable logical device, a discrete gate or transistor logical device, a discrete hardware assembly, or the like. The general-purpose processor may be a microprocessor, or the processor may be any conventional processor or the like.

The memory 730 may include a read-only memory and a random access memory, and provide an instruction and data for the processor 710. A part of the memory 730 may further include a non-volatile random access memory. For example, the memory 730 may further store device type information.

In addition to a data bus, the bus system 740 may further include a power supply bus, a control bus, a status signal bus, and the like. However, for clear description, various buses are represented by the bus system 740 in the figure.

In an implementation process, steps of the foregoing methods may be implemented by using an integrated logic circuit of hardware in the processor 710 or by using an instruction in a form of software. The steps of the methods disclosed with reference to the embodiments of the present application may be directly implemented by a hardware processor, or may be implemented by a combination of hardware and a software module in the processor. The software module may be located in a mature storage medium in the art, such as a random access memory, a flash memory, a read-only memory, a programmable read-only memory, an electrically-erasable programmable memory, or a register. The storage medium is located in the memory 730. The processor 710 reads information from the memory 730 and implements the steps in the foregoing methods in combination with hardware of the processor 710. To avoid repetition, details are not further described herein.

The information transmission device 700 in this embodiment of the present application may be corresponding to the network device in the method embodiments of the present application. In addition, units, namely, modules in the information transmission device 700 and other operations and/or functions described above are separately used to implement corresponding procedures in the method 200 in FIG. 2. For brevity, details are not further described herein.

According to the uplink data transmission device in this embodiment of the present application, a time-frequency resource used for uplink transmission is divided into a control time-frequency resource and a data time-frequency resource. A network device and a terminal device agree to use a control encoding scheme and a control modulation scheme that are specific to information carried on the control time-frequency resource. After determining a data encoding scheme specific to uplink data, the terminal device performs, according to the agreed control encoding scheme and control modulation scheme, encoding processing and modulation processing on control information that indicates the data encoding scheme, to generate a control symbol. Correspondingly, the network device can perform demodulation processing and decoding processing on the control symbol according to the agreed control encoding scheme and control modulation scheme, to obtain the control information, and determine the uplink data encoding scheme indicated by the control information. This can implement negotiation of an uplink data encoding scheme without notification from the network device, improve flexibility of uplink transmission, and improve reliability of a grant-free transmission solution.

Figure 11:
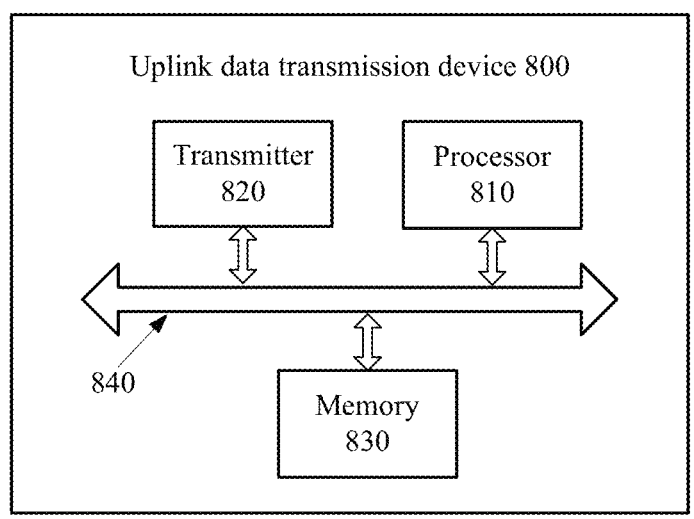
FIG. 11 is a schematic structural diagram of an uplink data transmission device according to an embodiment of the present application.

FIG. 11 is a schematic block diagram of an information transmission device 800 according to an embodiment of the present application. As shown in FIG. 11, the device 800 includes a processor 810 and a transmitter 820, and the processor 810 is connected to the transmitter 820. Optionally, the device 800 further includes a memory 830, and the memory 830 is connected to the processor 810. Further, optionally, the device 800 includes a bus system 840. The processor 810, the memory 830, and the transmitter 820 may be connected by using the bus system 840. The memory 830 may be configured to store an instruction. The processor 810 is configured to execute the instruction stored in the memory 830, so as to control the transmitter 820 to send information or a signal.

The processor 810 is configured to perform encoding and modulation processing on control information according to a control encoding scheme and a control modulation scheme that are used by the device, to obtain a control symbol, where the control information is used to indicate a data encoding scheme used by the device; and configured to control the transmitter 820 to send the control symbol to a network device by using a control time-frequency resource, and send a data symbol to the network device by using a data time-frequency resource, where the control time-frequency resource and the data time-frequency resource belong to a transmission resource that is used for uplink transmission, the control time-frequency resource and the data time-frequency resource are different, and the data symbol is generated after the device performs encoding processing on uplink data according to the data encoding scheme used by the device.

Optionally, the data symbol is sent by the device to the network device in a grant-free transmission mode. The grant-free transmission means that the network device pre-allocates multiple transmission resources and notifies the device of the multiple transmission resources, so that the device selects at least one transmission resource from the multiple transmission resources when having an uplink data transmission requirement, and sends the uplink data by using the selected transmission resource.

Optionally, the control encoding scheme includes a bit rate used when encoding processing is performed on the control information, and the control modulation scheme includes a modulation order and a code domain resource that are used when modulation processing is performed on the control information.

Optionally, the control encoding scheme and the control modulation scheme that are used by the device are determined according to a pilot resource used when the device transmits the control symbol.

Optionally, the data encoding scheme used by the device includes a bit rate used when the device performs encoding processing on the uplink data.

Optionally, the data symbol is generated after the device performs modulation processing on the uplink data according to a data modulation scheme used by the device.

Optionally, the data modulation scheme used by the device includes a modulation order and a code domain resource that are used when the device performs modulation processing on the uplink data.

Optionally, the control modulation scheme used by the device is the same as the data modulation scheme used by the device.

Optionally, the data modulation scheme used by the device is determined according to a pilot resource used by the device.

Optionally, the control information is further used to indicate the data modulation scheme used by the device.

Optionally, the control information is an index value corresponding to the data encoding scheme and the data modulation scheme that are used by the device, and the control information is determined by the device according to mapping relationship information. The mapping relationship information is used to indicate a one-to-one mapping relationship between multiple parameter sets and multiple index values. Each parameter set includes a data encoding scheme and a data modulation scheme. Any two parameter sets are different in at least one of the data encoding scheme or the data modulation scheme.

Optionally, the device further includes a receiver, connected to the processor.

The processor is further configured to control the receiver to receive the mapping relationship information sent by the network device.

Optionally, the device further includes a receiver, connected to the processor.

The processor is further configured to control the receiver to receive indication information of the control time-frequency resource sent by the network device, where the indication information of the control time-frequency resource is used to indicate a location of the control time-frequency resource in multiple time-frequency resources included in the transmission resource; and configured to determine the control time-frequency resource from the multiple time-frequency resources according to the indication information of the control time-frequency resource.

Optionally, the indication information of the control time-frequency resource is specifically used to indicate that multiple control time-frequency resources are continuously distributed among the multiple time-frequency resources; or the indication information of the control time-frequency resource is specifically used to indicate that multiple control time-frequency resources are discretely distributed among the multiple time-frequency resources.

Optionally, when one control time-frequency resource is used to transmit a control symbol of only one device, the control time-frequency resource used when the device transmits the control symbol is determined according to the pilot resource used when the device transmits the control symbol.

Optionally, the device further includes a receiver, connected to the processor.

The processor is further configured to control the receiver to receive non-multiplexing mode information sent by the network device. The non-multiplexing mode information is used to indicate that one control time-frequency resource is used to transmit a control symbol of only one device.

Optionally, when one control time-frequency resource can be used to transmit control symbols of multiple devices, different code domain resources are used when the multiple devices generate the control symbols.

Optionally, the device further includes a receiver, connected to the processor.

The processor is further configured to control the receiver to receive multiplexing mode information sent by the network device. The multiplexing mode information is used to indicate that one control time-frequency resource can be used to transmit control symbols of multiple devices.

Optionally, the control information is further used to indicate a device identifier of the device.

Optionally, the network device is a base station, and the device is user equipment.

It should be understood that, in this embodiment of the present application, the processor 810 may be a central processing unit (Central Processing Unit, "CPU" for short). The processor 810 may be another general-purpose processor, a digital signal processor (DSP), an application-specific integrated circuit (ASIC), a field programmable gate array (FPGA) or other programmable logical device, a discrete gate or transistor logical device, a discrete hardware assembly, or the like. The general-purpose processor may be a microprocessor, or the processor may be any conventional processor or the like.

The memory 830 may include a read-only memory and a random access memory, and provide an instruction and data for the processor 810. A part of the memory 830 may further include a non-volatile random access memory. For example, the memory 830 may further store device type information.

In addition to a data bus, the bus system 840 may further include a power supply bus, a control bus, a status signal bus, and the like. However, for clear description, various buses are represented by the bus system 840 in the figure.

In an implementation process, steps of the foregoing methods may be implemented by using an integrated logic circuit of hardware in the processor 810 or by using an instruction in a form of software. The steps of the methods disclosed with reference to the embodiments of the present application may be directly implemented by a hardware processor, or may be implemented by a combination of hardware and a software module in the processor. The software module may be located in a mature storage medium in the art, such as a random access memory, a flash memory, a read-only memory, a programmable read-only memory, an electrically-erasable programmable memory, or a register. The storage medium is located in the memory 830. The processor 810 reads information from the memory 830 and implements the steps in the foregoing methods in combination with hardware of the processor 810. To avoid repetition, details are not further described herein.

The information transmission device 800 in this embodiment of the present application may be corresponding to the terminal device in the method embodiments of the present application. In addition, units, namely, modules in the information transmission device 800 and other operations and/or functions described above are separately used to implement corresponding procedures in the method 400 in FIG. 7. For brevity, details are not further described herein.

According to the uplink data transmission device in this embodiment of the present application, a time-frequency resource used for uplink transmission is divided into a control time-frequency resource and a data time-frequency resource. A network device and a terminal device agree to use a control encoding scheme and a control modulation scheme that are specific to information carried on the control time-frequency resource. After determining a data encoding scheme specific to uplink data, the terminal device performs, according to the agreed control encoding scheme and control modulation scheme, encoding processing and modulation processing on control information that indicates the data encoding scheme, to generate a control symbol. Correspondingly, the network device can perform demodulation processing and decoding processing on the control symbol according to the agreed control encoding scheme and control modulation scheme, to obtain the control information, and determine the uplink data encoding scheme indicated by the control information. This can implement negotiation of an uplink data encoding scheme without notification from the network device, improve flexibility of uplink transmission, and improve reliability of a grant-free transmission solution.

It should be understood that sequence numbers of the foregoing processes do not mean execution sequences in various embodiments of the present application. The execution sequences of the processes should be determined according to functions and internal logic of the processes, and should not be construed as any limitation on the implementation processes of the embodiments of the present application.

Persons of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of the present application.

It may be clearly understood by persons skilled in the art that, for the purpose of convenient and brief description, for a detailed working process of the foregoing system, apparatus, and unit, refer to a corresponding process in the foregoing method embodiments, and details are not further described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections between some interfaces, apparatuses, or units, and may be implemented in electronic, mechanical, or other forms.

The units described as separate parts may or may not be physically separate. Parts displayed as units may or may not be physical units, and may be located in one position or may be distributed in a plurality of network units. Some or all of the units may be selected according to actual requirements to achieve the objectives of the solutions of the embodiments.

In addition, functional units in the embodiments of the present application may be integrated into one processing unit, or each of the units may exist alone physically, or two or more units are integrated into one unit.

It may be understood that, to make the application document brief and clear, technical features and descriptions in any of the foregoing embodiments may be applicable to other embodiments. For example, the technical features of the method embodiments may be applicable to the apparatus embodiments or other method embodiments, and details are not further described in other embodiments.

The transmission module, the transmission unit, or the transmitter in the embodiments may perform transmission on an air interface, or instead of performing transmission on an air interface, transmit data to another device, so that the another device performs transmission on the air interface. The receiving module, the receiving unit, or the receiver in the embodiments may perform reception over an air interface, or instead of performing reception over an air interface, receive data from another device that performs reception on the air interface.

When the functions are implemented in the form of a software functional unit and sold or used as an independent product, the functions may be stored in a computer-readable storage medium. Based on such an understanding, the technical solutions of the present application essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present application, but are not intended to limit the protection scope of the present application. Any variation or replacement readily figured out by persons skilled in the art within the technical scope disclosed in the present application shall fall within the protection scope of the present application. Therefore, the protection scope of the present application shall be subject to the protection scope of the claims.

Further embodiments of the present application are provided in the following. It should be noted that the numbering used in the following section does not necessarily need to comply with the numbering used in the previous sections. Each embodiment starts from a numbering. The numbering of following embodiments may not be consecutive.

1. An uplink data transmission method, wherein the method comprises:

receiving, by a network device, a control symbol sent by a terminal device by using a control time-frequency resource, wherein the control symbol is generated after the terminal device performs encoding and modulation processing on control information according to a control encoding scheme and a control modulation scheme that are used by the terminal device, the control information is used to indicate a data encoding scheme used by the terminal device, the control time-frequency resource belongs to a transmission resource that is used for uplink transmission, the transmission resource further comprises a data time-frequency resource, and the control time-frequency resource and the data time-frequency resource are different;

performing demodulation and decoding processing on the control symbol according to the control encoding scheme and the control modulation scheme that are used by the terminal device, to obtain the control information; and performing, according to the control information, decoding processing on a data symbol sent by the terminal device by using the data time-frequency resource, to obtain uplink data, wherein the data symbol is generated after the terminal device performs encoding processing on the uplink data according to the data encoding scheme used by the terminal device.

2. The method according to embodiment 1, wherein the data symbol is sent by the terminal device to the network device in a grant-free transmission mode, wherein the grant-free transmission means that the network device preallocates multiple transmission resources and notifies the terminal device of the multiple transmission resources, so that the terminal device selects at least one transmission resource from the multiple transmission resources when having an uplink data transmission requirement, and sends the uplink data by using the selected transmission resource.

3. The method according to embodiment 1 or 2, wherein the control encoding scheme comprises a bit rate used when encoding processing is performed on the control information; and the control modulation scheme comprises at least one of a modulation order or a code domain resource used when modulation processing is performed on the control information.

4. The method according to any one of embodiments 1 to 3, wherein the control encoding scheme and the control modulation scheme that are used by the terminal device are determined according to a pilot resource used when the terminal device transmits the control symbol.

5. The method according to any one of embodiments 1 to 4, wherein the data encoding scheme used by the terminal device comprises a bit rate used when the terminal device performs encoding processing on the uplink data.

6. The method according to any one of embodiments 1 to 5, wherein the method further comprises:

performing demodulation processing on the data symbol according to a data modulation scheme used by the terminal device, to obtain the uplink data, wherein the data symbol is generated after the terminal device performs modulation processing on the uplink data according to the data modulation scheme used by the terminal device.

7. The method according to embodiment 6, wherein the data modulation scheme used by the terminal device comprises at least one of a modulation order or a code domain resource used when the terminal device performs modulation processing on the uplink data.

8. The method according to embodiment 6 or 7, wherein the control modulation scheme used by the terminal device is the same as the data modulation scheme used by the terminal device.

9. The method according to any one of embodiments 6 to 8, wherein the data modulation scheme used by the terminal device is determined according to a pilot resource used by the terminal device.

10. The method according to any one of embodiments 6 to 9, wherein the control information is further used to indicate the data modulation scheme used by the terminal device.

11. The method according to embodiment 10, wherein the control information is an index value corresponding to the data encoding scheme and the data modulation scheme that are used by the terminal device, the control information is determined by the terminal device according to mapping relationship information, the mapping relationship information is used to indicate a one-to-one mapping relationship between multiple parameter sets and multiple index values, each parameter set comprises a data encoding scheme and a data modulation scheme, and any two parameter sets are different in at least one of the data encoding scheme or the data modulation scheme.

12. The method according to embodiment 11, wherein the method further comprises:

sending the mapping relationship information to the terminal device.

13. The method according to any one of embodiments 1 to 12, wherein the method further comprises:

sending indication information of the control time-frequency resource to the terminal device, wherein the indication information of the control time-frequency resource is used to indicate a location of the control time-frequency resource in multiple time-frequency resources comprised in the transmission resource.

14. The method according to embodiment 13, wherein the indication information of the control time-frequency resource is specifically used to indicate that multiple control time-frequency resources are continuously distributed among the multiple time-frequency resources; or the indication information of the control time-frequency resource is specifically used to indicate that multiple control time-frequency resources are discretely distributed among the multiple time-frequency resources.

15. The method according to any one of embodiments 1 to 14, wherein when one control time-frequency resource is used to transmit a control symbol of only one terminal device, the control time-frequency resource used when the terminal device transmits the control symbol is determined according to the pilot resource used when the terminal device transmits the control symbol.

16. The method according to embodiment 15, wherein the method further comprises:

sending non-multiplexing mode information to the terminal device, wherein the non-multiplexing mode information is used to indicate that one control time-frequency resource is used to transmit a control symbol of only one terminal device.

17. The method according to any one of embodiments 1 to 14, wherein when one control time-frequency resource can be used to transmit control symbols of multiple terminal devices, different code domain resources are used when the multiple terminal devices generate the control symbols.

18. The method according to embodiment 17, wherein the method further comprises:

sending multiplexing mode information to the terminal device, wherein the multiplexing mode information is used to indicate that one control time-frequency resource can be used to transmit control symbols of multiple terminal devices.

19. The method according to any one of embodiments 1 to 18, wherein the control information is further used to indicate a device identifier of the terminal device.

20. The method according to any one of embodiments 1 to 19, wherein the network device is a base station, and the terminal device is user equipment.

21. An uplink data transmission method, wherein the method comprises:

performing, by a terminal device, encoding and modulation processing on control information according to a control encoding scheme and a control modulation scheme that are used by the terminal device, to obtain a control symbol, wherein the control information is used to indicate a data encoding scheme used by the terminal device; and sending the control symbol to a network device by using a control time-frequency resource, and sending a data symbol to the network device by using a data time-frequency resource, wherein the control time-frequency resource and the data time-frequency resource belong to a transmission resource that is used for uplink transmission, the control time-frequency resource and the data time-frequency resource are different, and the data symbol is generated after the terminal device performs encoding processing on uplink data according to the data encoding scheme used by the terminal device.

22. The method according to embodiment 21, wherein the data symbol is sent by the terminal device to the network device in a grant-free transmission mode, wherein the grant-free transmission means that the network device preallocates multiple transmission resources and notifies the terminal device of the multiple transmission resources, so that the terminal device selects at least one transmission resource from the multiple transmission resources when having an uplink data transmission requirement, and sends the uplink data by using the selected transmission resource.

23. The method according to embodiment 21 or 22, wherein the control encoding scheme comprises a bit rate used when encoding processing is performed on the control information; and the control modulation scheme comprises at least one of a modulation order or a code domain resource used when modulation processing is performed on the control information.

24. The method according to any one of embodiments 21 to 23, wherein the control encoding scheme and the control modulation scheme that are used by the terminal device are determined according to a pilot resource used when the terminal device transmits the control symbol.

25. The method according to any one of embodiments 21 to 24, wherein the data encoding scheme used by the terminal device comprises a bit rate used when the terminal device performs encoding processing on the uplink data.

26. The method according to any one of embodiments 21 to 25, wherein the data symbol is generated after the terminal device performs modulation processing on the uplink data according to a data modulation scheme used by the terminal device.

27. The method according to embodiment 26, wherein the data modulation scheme used by the terminal device comprises at least one of a modulation order or a code domain resource used when the terminal device performs modulation processing on the uplink data.

28. The method according to embodiment 26 or 27, wherein the control modulation scheme used by the terminal device is the same as the data modulation scheme used by the terminal device.

29. The method according to any one of embodiments 26 to 28, wherein the data modulation scheme used by the terminal device is determined according to a pilot resource used by the terminal device.

30. The method according to any one of embodiments 26 to 29, wherein the control information is further used to indicate the data modulation scheme used by the terminal device.

31. The method according to embodiment 30, wherein the control information is an index value corresponding to the data encoding scheme and the data modulation scheme that are used by the terminal device, the control information is determined by the terminal device according to mapping relationship information, the mapping relationship information is used to indicate a one-to-one mapping relationship between multiple parameter sets and multiple index values, each parameter set comprises a data encoding scheme and a data modulation scheme, and any two parameter sets are different in at least one of the data encoding scheme or the data modulation scheme.

32. The method according to embodiment 31, wherein the method further comprises:

receiving the mapping relationship information sent by the network device.

33. The method according to any one of embodiments 21 to 32, wherein the method further comprises:

receiving indication information of the control time-frequency resource sent by the network device, wherein the indication information of the control time-frequency resource is used to indicate a location of the control time-frequency resource in multiple time-frequency resources comprised in the transmission resource; and determining the control time-frequency resource from the multiple time-frequency resources according to the indication information of the control time-frequency resource.

34. The method according to embodiment 33, wherein the indication information of the control time-frequency resource is specifically used to indicate that multiple control time-frequency resources are continuously distributed among the multiple time-frequency resources; or the indication information of the control time-frequency resource is specifically used to indicate that multiple control time-frequency resources are discretely distributed among the multiple time-frequency resources.

35. The method according to any one of embodiments 21 to 34, wherein when one control time-frequency resource is used to transmit a control symbol of only one terminal device, the control time-frequency resource used when the terminal device transmits the control symbol is determined according to the pilot resource used when the terminal device transmits the control symbol.

36. The method according to embodiment 35, wherein the method further comprises:

receiving non-multiplexing mode information sent by the network device, wherein the non-multiplexing mode information is used to indicate that one control time-frequency resource is used to transmit a control symbol of only one terminal device.

37. The method according to any one of embodiments 21 to 34, wherein when one control time-frequency resource can be used to transmit control symbols of multiple terminal devices, different code domain resources are used when the multiple terminal devices generate the control symbols.

38. The method according to embodiment 37, wherein the method further comprises:

receiving multiplexing mode information sent by the network device, wherein the multiplexing mode information is used to indicate that one control time-frequency resource can be used to transmit control symbols of multiple terminal devices.

39. The method according to any one of embodiments 21 to 38, wherein the control information is further used to indicate a device identifier of the terminal device.

40. The method according to any one of embodiments 21 to 39, wherein the network device is a base station, and the terminal device is user equipment.

41. An uplink data transmission device, wherein the device comprises:

a receiver; and a processor, connected to the receiver, and configured to control the receiver to receive a control symbol sent by a terminal device by using a control time-frequency resource, wherein the control symbol is generated after the terminal device performs encoding and modulation processing on control information according to a control encoding scheme and a control modulation scheme that are used by the terminal device, the control information is used to indicate a data encoding scheme used by the terminal device, the control time-frequency resource belongs to a transmission resource that is used for uplink transmission, the transmission resource further comprises a data time-frequency resource, and the control time-frequency resource and the data time-frequency resource are different;

configured to perform demodulation and decoding processing on the control symbol according to the control encoding scheme and the control modulation scheme that are used by the terminal device, to obtain the control information; and configured to perform, according to the control information, decoding processing on a data symbol sent by the terminal device by using the data time-frequency resource, to obtain uplink data, wherein the data symbol is generated after the terminal device performs encoding processing on the uplink data according to the data encoding scheme used by the terminal device.

42. The device according to embodiment 41, wherein the data symbol is sent by the terminal device to the device in a grant-free transmission mode, wherein the grant-free transmission means that the device preallocates multiple transmission resources and notifies the terminal device of the multiple transmission resources, so that the terminal device selects at least one transmission resource from the multiple transmission resources when having an uplink data transmission requirement, and sends the uplink data by using the selected transmission resource.

43. The device according to embodiment 41 or 42, wherein the control encoding scheme comprises a bit rate used when encoding processing is performed on the control information; and the control modulation scheme comprises at least one of a modulation order or a code domain resource used when modulation processing is performed on the control information.

44. The device according to any one of embodiments 41 to 43, wherein the control encoding scheme and the control modulation scheme that are used by the terminal device are determined according to a pilot resource used when the terminal device transmits the control symbol.

45. The device according to any one of embodiments 41 to 44, wherein the data encoding scheme used by the terminal device comprises a bit rate used when the terminal device performs encoding processing on the uplink data.

46. The device according to any one of embodiments 41 to 45, wherein the processor is further configured to perform demodulation processing on the data symbol according to a data modulation scheme used by the terminal device, to obtain the uplink data, wherein the data symbol is generated after the terminal device performs modulation processing on the uplink data according to the data modulation scheme used by the terminal device.

47. The device according to embodiment 46, wherein the data modulation scheme used by the terminal device comprises at least one of a modulation order or a code domain resource used when the terminal device performs modulation processing on the uplink data.

48. The device according to embodiment 46 or 47, wherein the control modulation scheme used by the terminal device is the same as the data modulation scheme used by the terminal device.

49. The device according to any one of embodiments 46 to 48, wherein the data modulation scheme used by the terminal device is determined according to a pilot resource used by the terminal device.

50. The device according to any one of embodiments 46 to 49, wherein the control information is further used to indicate the data modulation scheme used by the terminal device.

51. The device according to embodiment 50, wherein the control information is an index value corresponding to the data encoding scheme and the data modulation scheme that are used by the terminal device, the control information is determined by the terminal device according to mapping relationship information, the mapping relationship information is used to indicate a one-to-one mapping relationship between multiple parameter sets and multiple index values, each parameter set comprises a data encoding scheme and a data modulation scheme, and any two parameter sets are different in at least one of the data encoding scheme or the data modulation scheme.

52. The device according to embodiment 51, wherein the device further comprises a transmitter, connected to the processor; and the processor is further configured to control the transmitter to send the mapping relationship information to the terminal device.

53. The device according to any one of embodiments 41 to 52, wherein the device further comprises a transmitter, connected to the processor; and the processor is further configured to control the transmitter to send indication information of the control time-frequency resource to the terminal device, wherein the indication information of the control time-frequency resource is used to indicate a location of the control time-frequency resource in multiple time-frequency resources comprised in the transmission resource.

54. The device according to embodiment 53, wherein the indication information of the control time-frequency resource is specifically used to indicate that multiple control time-frequency resources are continuously distributed among the multiple time-frequency resources; or the indication information of the control time-frequency resource is specifically used to indicate that multiple control time-frequency resources are discretely distributed among the multiple time-frequency resources.

55. The device according to any one of embodiments 41 to 54, wherein when one control time-frequency resource is used to transmit a control symbol of only one terminal device, the control time-frequency resource used when the terminal device transmits the control symbol is determined according to the pilot resource used when the terminal device transmits the control symbol.

56. The device according to embodiment 55, wherein the device further comprises a transmitter, connected to the processor; and the processor is further configured to control the transmitter to send non-multiplexing mode information to the terminal device, wherein the non-multiplexing mode information is used to indicate that one control time-frequency resource is used to transmit a control symbol of only one terminal device.

57. The device according to any one of embodiments 41 to 54, wherein when one control time-frequency resource can be used to transmit control symbols of multiple terminal devices, different code domain resources are used when the multiple terminal devices generate the control symbols.

58. The device according to embodiment 57, wherein the device further comprises a transmitter, connected to the processor; and the processor is further configured to control the transmitter to send multiplexing mode information to the terminal device, wherein the multiplexing mode information is used to indicate that one control time-frequency resource can be used to transmit control symbols of multiple terminal devices.

59. The device according to any one of embodiments 41 to 58, wherein the control information is further used to indicate a device identifier of the terminal device.

60. The device according to any one of embodiments 41 to 59, wherein the device is a base station, and the terminal device is user equipment.

61. An uplink data transmission device, wherein the device comprises:

a transmitter; and a processor, connected to the transmitter, and configured to perform encoding and modulation processing on control information according to a control encoding scheme and a control modulation scheme that are used by the device, to obtain a control symbol, wherein the control information is used to indicate a data encoding scheme used by the device; and configured to control the transmitter to send the control symbol to a network device by using a control time-frequency resource, and send a data symbol to the network device by using a data time-frequency resource, wherein the control time-frequency resource and the data time-frequency resource belong to a transmission resource that is used for uplink transmission, the control time-frequency resource and the data time-frequency resource are different, and the data symbol is generated after the device performs encoding processing on uplink data according to the data encoding scheme used by the device.

62. The device according to embodiment 61, wherein the data symbol is sent by the device to the network device in a grant-free transmission mode, wherein the grant-free transmission means that the network device preallocates multiple transmission resources and notifies the device of the multiple transmission resources, so that the device selects at least one transmission resource from the multiple transmission resources when having an uplink data transmission requirement, and sends the uplink data by using the selected transmission resource.

63. The device according to embodiment 61 or 62, wherein the control encoding scheme comprises a bit rate used when encoding processing is performed on the control information; and the control modulation scheme comprises at least one of a modulation order or a code domain resource used when modulation processing is performed on the control information.

64. The device according to any one of embodiments 61 to 63, wherein the control encoding scheme and the control modulation scheme that are used by the device are determined according to a pilot resource used when the device transmits the control symbol.

65. The device according to any one of embodiments 61 to 64, wherein the data encoding scheme used by the device comprises a bit rate used when the device performs encoding processing on the uplink data.

66. The device according to any one of embodiments 61 to 65, wherein the data symbol is generated after the device performs modulation processing on the uplink data according to a data modulation scheme used by the device.

67. The device according to embodiment 66, wherein the data modulation scheme used by the device comprises at least one of a modulation order or a code domain resource used when the device performs modulation processing on the uplink data.

68. The device according to embodiment 66 or 67, wherein the control modulation scheme used by the device is the same as the data modulation scheme used by the device.

69. The device according to any one of embodiments 66 to 68, wherein the data modulation scheme used by the device is determined according to a pilot resource used by the device.

70. The device according to any one of embodiments 66 to 69, wherein the control information is further used to indicate the data modulation scheme used by the device.

71. The device according to embodiment 70, wherein the control information is an index value corresponding to the data encoding scheme and the data modulation scheme that are used by the device, the control information is determined by the device according to mapping relationship information, the mapping relationship information is used to indicate a one-to-one mapping relationship between multiple parameter sets and multiple index values, each parameter set comprises a data encoding scheme and a data modulation scheme, and any two parameter sets are different in at least one of the data encoding scheme or the data modulation scheme.

72. The device according to embodiment 71, wherein the device further comprises a receiver, connected to the processor; and the processor is further configured to control the receiver to receive the mapping relationship information sent by the network device.

73. The device according to any one of embodiments 61 to 72, wherein the device further comprises a receiver, connected to the processor; and the processor is further configured to control the receiver to receive indication information of the control time-frequency resource sent by the network device, wherein the indication information of the control time-frequency resource is used to indicate a location of the control time-frequency resource in multiple time-frequency resources comprised in the transmission resource; and determine the control time-frequency resource from the multiple time-frequency resources according to the indication information of the control time-frequency resource.

74. The device according to embodiment 73, wherein the indication information of the control time-frequency resource is specifically used to indicate that multiple control time-frequency resources are continuously distributed among the multiple time-frequency resources; or the indication information of the control time-frequency resource is specifically used to indicate that multiple control time-frequency resources are discretely distributed among the multiple time-frequency resources.

75. The device according to any one of embodiments 61 to 74, wherein when one control time-frequency resource is used to transmit a control symbol of only one device, the control time-frequency resource used when the device transmits the control symbol is determined according to the pilot resource used when the device transmits the control symbol.

76. The device according to embodiment 75, wherein the device further comprises a receiver, connected to the processor; and the processor is further configured to control the receiver to receive non-multiplexing mode information sent by the network device, wherein the non-multiplexing mode information is used to indicate that one control time-frequency resource is used to transmit a control symbol of only one device.

77. The device according to any one of embodiments 61 to 74, wherein when one control time-frequency resource can be used to transmit control symbols of multiple devices, different code domain resources are used when the multiple devices generate the control symbols.

78. The device according to embodiment 77, wherein the device further comprises a receiver, connected to the processor; and the processor is further configured to control the receiver to receive multiplexing mode information sent by the network device, wherein the multiplexing mode information is used to indicate that one control time-frequency resource can be used to transmit control symbols of multiple devices.

79. The device according to any one of embodiments 61 to 78, wherein the control information is further used to indicate a device identifier of the device.

80. The device according to any one of embodiments 61 to 79, wherein the network device is a base station, and the device is user equipment.

What is claimed is:

1. An uplink data transmission method, applied to a network device, comprising:
   receiving, by the network device, a control symbol sent by a terminal device using a control time-frequency resource,
      wherein the control symbol is generated from control information according to encoding and modulation schemes at the terminal device,
      wherein the control information indicates data encoding and modulation schemes at the terminal device,
      wherein the control information is an index value associated with the data encoding and modulation schemes,
      wherein the control information is determined according to a one-to-one mapping relationship between parameter sets and index values,
      wherein each parameter set comprises an encoding scheme and a modulation scheme, and
      wherein any two parameter sets are different in at least one of the encoding scheme and the modulation scheme,
      wherein the control time-frequency resource belongs to a transmission resource for uplink transmission,
      wherein the transmission resource comprises a data time-frequency resource, and
      wherein the control time-frequency resource and the data time-frequency resource are different;
   demodulating and decoding, by the network device, the control symbol according to the encoding and modulation schemes at the terminal device to obtain the control information; and
   decoding, by the network device, according to the control information, a data symbol to obtain uplink data,
      wherein the data symbol is received from the terminal device through the data time-frequency resource.

2. The method according to claim 1, wherein the encoding scheme and the modulation scheme are determined according to a pilot resource.

3. The method according to claim 2, wherein the modulation scheme for the control symbol is the same as the data modulation scheme.

4. The method according to claim 3, wherein the data modulation scheme is determined according to a pilot resource.

5. The method according to claim 1, further comprising:
   demodulating, by the network device, the data symbol according to a data modulation scheme used to obtain the uplink data.

6. The method according to claim 1, further comprising sending the mapping relationship information to the terminal device.

7. The method according to claim 1, further comprising:
   sending, by the network device, indication information of the control time-frequency resource to the terminal device, wherein the indication information of the control time-frequency resource indicates a location of the control time-frequency resource in multiple time-frequency resources comprising the transmission resource.

8. The method according to claim 1, wherein the control time-frequency resource used upon determination of transmitting the control symbol by the terminal device, according to a pilot resource used when the control symbol is transmitted to the network device, wherein one control time-frequency resource is used to transmit a control symbol of only one terminal device.

9. An uplink data transmission device comprising:
   a processor;
   a receiver; and
   wherein the receiver is configured to cooperate with the processor to:
      receive a control symbol sent by a terminal device using a control time-frequency resource,
         wherein the control symbol is generated from control information according to encoding and modulation schemes at the terminal device,
         wherein the control information indicates data encoding and modulation schemes at the terminal device,
         wherein the control information is an index value associated with the data encoding and modulation schemes,
         wherein the control information is determined according to a one-to-one mapping relationship between parameter sets and index values,
         wherein each parameter set comprises an encoding scheme and a modulation scheme, and
         wherein any two parameter sets are different in at least one of the encoding scheme and the modulation scheme,
         wherein the control time-frequency resource belongs to a transmission resource for uplink transmission,
         wherein the transmission resource further comprises a data time-frequency resource, and
         wherein the control time-frequency resource and the data time-frequency resource are different;
   the processor is configured to:
      demodulate and decode the control symbol according to the encoding and modulation schemes at the terminal device to obtain the control information; and
      decode, according to the control information, a data symbol to obtain uplink data,
         wherein the data symbol is received from the terminal device through the data time-frequency resource.

10. The device according to claim 9, wherein the encoding and modulation schemes are determined according to a pilot resource.

11. The device according to claim 9, wherein the modulation scheme at the terminal device is the same as the data modulation scheme.

12. The device according to claim 11, wherein the data modulation scheme is determined according to a pilot resource.

13. The device according to claim 9, further comprising a transmitter connected to the processor; and
   the transmitter is further configured to cooperate with the processor to send the mapping relationship information to the terminal device.

14. The device according to claim 9, further comprising a transmitter connected to the processor; and
   the transmitter is further configured to cooperate with the processor to send the terminal device indication information of the control time-frequency resource, wherein the indication information of the control time-frequency resource indicates a location of the control time-frequency resource in multiple time-frequency resources comprising the transmission resource.

15. The device according to claim 9, wherein the control time-frequency resource is determined according to the pilot resource used during transmission of the control symbol by the terminal device, wherein one control time-frequency resource is used to transmit a control symbol of only one terminal device.

16. The device according to claim 9, wherein the control information further indicates a device identifier of the terminal device.

17. A non-transitory, computer-readable medium storing instructions for execution by a processor that, when executed by the processor, configure the processor to provide at least the following operations for uplink data transmission:

receiving a control symbol sent by a terminal device using a control time-frequency resource,
wherein the control symbol is generated from control information according to encoding and modulation schemes at the terminal device,
wherein the control information indicates data encoding and modulation schemes at the terminal device,
wherein the control information is an index value associated with the data encoding and modulation schemes,
wherein the control information is determined according to a one-to-one mapping relationship between parameter sets and index values,
wherein each parameter set comprises an encoding scheme and a modulation scheme,
wherein any two parameter sets are different in at least one of the encoding scheme and the modulation scheme,
wherein the control time-frequency resource belongs to a transmission resource for uplink transmission,
wherein the transmission resource comprises a data time-frequency resource, and
wherein the control time-frequency resource and the data time-frequency resource are different;
demodulating and decoding the control symbol according to the encoding and modulation schemes at the terminal device to obtain the control information; and
decoding according to the control information, a data symbol to obtain uplink data,
wherein the data symbol is received from the terminal device through the data time-frequency resource.

18. The non-transitory, computer readable medium according to claim 17, wherein the encoding scheme and the modulation scheme are determined according to a pilot resource.

19. The non-transitory, computer readable medium according to claim 17, wherein the instructions executed by the processor include instructions to configure the processor to demodulate the data symbol according to a data modulation scheme used to obtain the uplink data.

20. The non-transitory, computer readable medium according to claim 18, wherein the modulation scheme for the control symbol is the same as the data modulation scheme.

* * * * *